(12) United States Patent
Austin

(10) Patent No.: US 6,526,566 B1
(45) Date of Patent: Feb. 25, 2003

(54) GRAPHICAL PROGRAMMING SYSTEM AND METHOD INCLUDING NODES FOR PROGRAMMATICALLY ACCESSING DATA SOURCES AND TARGETS

(75) Inventor: Paul F. Austin, Austin, TX (US)

(73) Assignee: National Instruments Corporation, Austin, TX (US)

(*) Notice: Subject to any disclaimer, the term of this patent is extended or adjusted under 35 U.S.C. 154(b) by 0 days.

(21) Appl. No.: 09/837,888

(22) Filed: Apr. 18, 2001

Related U.S. Application Data

(63) Continuation-in-part of application No. 09/185,161, filed on Nov. 3, 1998, now Pat. No. 6,370,569
(60) Provisional application No. 60/065,557, filed on Nov. 14, 1997.

(51) Int. Cl.[7] ............................................. G06F 17/30
(52) U.S. Cl. ........................ 717/109; 717/1; 709/229
(58) Field of Search ............................. 709/227, 229, 709/225, 217; 717/1, 109

(56) References Cited

U.S. PATENT DOCUMENTS

| | | |
|---|---|---|
| 5,706,507 A | 1/1998 | Schloss |
| 5,774,664 A | 6/1998 | Hidary et al. |
| 5,878,219 A | 3/1999 | Vance, Jr. et al. |
| 5,890,172 A | 3/1999 | Borman et al. |
| 5,974,416 A | 10/1999 | Anand et al. |
| 6,041,360 A | 3/2000 | Himmel et al. |
| 6,076,733 A * | 6/2000 | Wilz et al. .................. 235/375 |
| 6,101,510 A * | 8/2000 | Stone et al. ................. 707/513 |
| 6,102,965 A * | 8/2000 | Dye et al. .................... 717/109 |
| 6,119,153 A | 9/2000 | Dujari et al. |
| 6,138,150 A * | 10/2000 | Nichols et al. .............. 345/835 |
| 6,163,779 A * | 12/2000 | Mantha et al. ................. 707/1 |
| 6,175,862 B1 | 1/2001 | Chen et al. |
| 6,282,699 B1 * | 8/2001 | Zhang et al. ................ 717/109 |

OTHER PUBLICATIONS

Instrumentation Reference and Catalogue 1997, Test and Measurement Industrial Automation, Internet–Ready Software Development, pp. 2–91–2–92.

* cited by examiner

*Primary Examiner*—Krisna Lim
(74) *Attorney, Agent, or Firm*—Jeffrey C. Hood

(57) ABSTRACT

A system and method for creating a graphical program which accesses data from/to one or more of a data source or a data target. The present invention greatly simplifies the task of creating or configuring a graphical program to exchange data with a data source and/or data target. When a user is creating or configuring a graphical program, the user may cause various nodes or icons to be displayed on the display and may connect the various nodes or icons together. If the user desires the graphical program to access data from/to one or more of a data source or a data target, the user may cause to be displayed a data access node in the graphical program. The user may then configure the data access node with location information of one or more of a data source or a data target. For example, the user may provide a URL specifying a location of the data source or the data target. The computer system may then construct execution instructions in response to the graphical program, wherein the execution instructions are executable to access data from/to the one or more of the data source or the data target as indicated by the data access node. The execution instructions may then be executed, wherein the data access node accesses data from/to the one or more of the data source or the data target during execution.

106 Claims, 14 Drawing Sheets

DataSocket Read

DataSocket Write

GRAPHICAL PROGRAMMING SYSTEM AND METHOD INCLUDING NODES FOR PROGRAMMATICALLY ACCESSING DATA SOURCES AND TARGETS

This application is a continuation-in-part of U.S. patent application Ser. No. 09/185,161, now U.S. Pat. No. 6,370, 569, titled "Data Socket System and Method for Accessing Data Sources Using URLs", filed Nov. 3, 1998, whose inventor was Paul F. Austin, which claims benefit of priority of provisional application Ser. No. 60/065,557 titled "Data Socket Client for Improved Data Access" filed Nov. 14, 1997, whose inventor was Paul F. Austin.

FIELD OF THE INVENTION

The present invention relates to the field of graphical programming, and more particularly to one or more nodes in a graphical program that are operable to access data sources or targets during execution of the graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301, 301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create or otherwise specify a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more Of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

Computer programs, including graphical programs, are often required to exchange data with a data source or data target external to the program. In modern networked computer systems, a software program may be required to obtain data from various sources, including local memory on the computer system, external data sources connected to the computer system, such as I/O devices connected to computer system ports, other networked computer systems, or other networked devices. Thus, in various applications, a program may write or provide data of any of various types to any of various types of data targets. Also, in various applications, a program may receive data of any of various types from any of various types of data sources.

For example, data may be received from a data source such as a file or from a server, such as an FTP or HTTP server. The data may comprise static data, such as prestored data in a file, or live data, such as data streamed in real time by a server. The data may also originate from another program or process running on the host computer system or a remote computer system. For example, a program for processing live weather data may utilize data received from a remote computer system that senses weather-related variables, such as temperature, wind speed, humidity, etc., and transduces these variables into data that the program can use.

One of the biggest challenges in developing complex applications that are comprised of different components is sharing and exchanging information and data between the different programs or components. Today, this task is solved using a number of different existing tools, including writing and reading files, DDE, ActiveX automation, http server and client tools, and more. As well known in the art, exchanging data with data sources or data targets external to a program is often difficult to implement. When a program executing on a computer system is required to access data, the program is often required to account for the source or location of the data, opening and closing of files, the format of the data, and conversion of the data to readable formats, among others.

For example, consider the program described above for processing weather data, wherein a client computer system that executes a client program is connected over a TCP/IP network to a server computer that generates the data. In order for the client program to receive the data from the server computer, the TCP protocol would typically be used, which may involve several steps, such as:

choosing a TCP/IP port number not in use by any other applications defining the application-level protocol (e.g., what gets sent when)

configuring the server computer to listen on the selected port and create a connection when the client program initiates a request configuring the server computer to marshal the data and write to all connections configuring the client program to connect to the selected port and unmarshal the data managing any errors This list only provides an overview of the complexity involved in receiving the data. Thus, this scenario illustrates several details that many graphical program developers would not have the necessary skill to deal with or would prefer not to deal with. Therefore, it would be desirable to provide a system and method to simplify the task of implementing data exchange for a graphical program.

Ideally, such a system and method would be independent of the type of data source or data target. For example, in the prior art, receiving data from a file would typically require the developer to code a different set of steps than if data were received from a remote server, as described in the above example. For example, the developer may need to program the steps of opening the file, reading data from the file, closing the file, etc. It would be desirable, for example, for a method of configuring a graphical program to receive waveform data from a local file to be the same or substantially the same as a method of configuring the graphical program to receive live waveform data generated by a remote application.

It would also be desirable for the system and method to be independent of the platform on which the program runs. Different computing platforms support different mechanisms for data exchange. For example, a Windows program may use DDE or ActiveX/COM, whereas programs running on other platforms use different mechanisms. In typical cases, graphical program developers would prefer to not concern themselves with platform-specific issues.

Hence, an improved system and method is desired for providing the ability to easily create graphical programs which can access data from/to various sources or targets and having various types or formats, wherein the access is performed invisibly to the user or programmer.

SUMMARY OF THE INVENTION

One embodiment of the present invention comprises a system and method for creating a graphical program which accesses data from/to one or more of a data source or a data target. The present invention greatly simplifies the task of creating or configuring a graphical program to exchange data with a data source and/or data target.

The method may operate in a computer including a display screen and a user input device. The computer may be coupled to a network, wherein the data source or the data target may comprise a device coupled to the network. The device may be a second computer system coupled to the network or an instrument coupled to the network.

When a user is creating or configuring a graphical program, the user may cause various nodes or icons to be displayed on the display. The user may then connect the various nodes or icons together in one or more of a data flow, control flow or execution flow format. If the user desires the graphical program to access data from/to one or more of a data source or a data target, the user may cause to be displayed a data access node in the graphical program. For example, the user may select the data access node from a palette or menu and "drag and drop" the node into the graphical program on the display. Thus, the user may arrange a plurality of nodes on the display, wherein the plurality of nodes include the data access node, and may connect the plurality of nodes together to create the graphical program.

The user may then configure the data access node with location information of one or more of a data source or a data target. For example, the user may provide a URL specifying a location of the data source or the data target. In one embodiment, the computer may store a description of the data sources and/or data targets in the computer. When the user indicates an interest in configuring the data access node, e.g., by selecting a data access node, the computer may display a list of data sources and/or data targets. The user may then provide input to select one or more of the data sources and/or data targets from the list.

Configuration of the data access node may comprise the user causing to be displayed an icon or node in the graphical program which references data source/target location information, e.g., which references a URL, and then associating the icon or node with the data access node. The user may associate the icon or node with the data access node by connecting the icon to the data access node or by dragging and dropping the icon onto the data access node. In this embodiment, the icon is operable to provide the data source/target location information to the data access node during execution of the graphical program. In another embodiment, the user may specify the data source/target using a dialog box or property panel for configuring the data access node.

The computer system may then construct execution instructions in response to the graphical program, wherein the execution instructions are executable to access data from/to the one or more of the data source or the data target. The execution instructions may then be executed, wherein the data access node accesses data from/to the one or more of the data source or the data target during execution.

During execution of the graphical program, the data access node is operable to 1) connect to the one or more of the data source or the data target using a reference to the data source or the data target; and 2) acquire data from/publish data to the one or more of the data source or the data target. The data access node may also be operable to convert received data or data to be transmitted from/to a format useable by the graphical program or the data target, such as a generic format or a self-describing format. Thus, during execution of the graphical program, the data access node is operable to access data from/to the one or more of the data source or the data target. If the data access node is configured to access a data source, then during execution of the graphical program the data access node is operable to acquire data from the data source. If the data access node is configured to access a data target, then during execution of the graphical program the data access node is operable to publish data to the data target. Where the data is live data, the data access node may be operable to continually access live data from/to the data source or the data target.

Where the data access node is configured to acquire data from a data source, the data access node may comprise one or more output terminals, and the user may connect the one or more output terminals of the data access node to one or more other nodes in the graphical program. During execution of the graphical program, the data access node may acquire data from the data source and provide the data to the one or more other nodes in the graphical program. The data access node may also optionally convert the data to a format understandable by the other nodes in the graphical program. In a similar manner, where the data access node is configured to publish data to a data target, the user may connect the one or more input terminals of the data access node to one or more other nodes in the graphical program. During execution of the graphical program, the one or more other nodes in the graphical program may provide data to the one or more input terminals of the data access node, and the data access node may publish the data to the data target. The data access node may also optionally convert the data received from the one or more other nodes to a format understandable by the data target.

In one embodiment, the data access node in the graphical program may comprise a "DataSocket" node. DataSocket technology provides a single, unified, end-user application programming interface (API) for connecting to data from a number of sources, such as local files, files on FTP or Web servers, and data items on OPC Servers. A DataSocket node specifies the data location by using a familiar networking standard, the URL. Just as a Web browser uses a URL to connect to a Web page, a DataSocket application uses a URL to connect to data. In addition, the DataSocket Transfer Protocol connects a DataSocket application to live data by specifying a connection to a DataSocket Server. The DataSocket Server manages most of the networking tasks for the developer.

With conventional technologies such as TCP/IP, the developer would have to write code to convert data to an unstructured stream of bytes in the broadcasting application, as well as code to parse the stream of bytes back into its original form in subscribing applications. DataSocket, however, transfers data in a self-describing format that can represent data in an unlimited number of formats, including strings, scalars, Booleans, and waveforms. The DataSocket read and write operations transparently convert data to and from the underlying byte streams, eliminating the need to write complicated parsing code. DataSocket uses the DataSocket Transport Protocol (DSTP), referred to above, to send data to and receive data from a DataSocket server.

BRIEF DESCRIPTION OF THE DRAWINGS

A better understanding of the present invention can be obtained when the following detailed description of the preferred embodiment is considered in conjunction with the following drawings, in which.

Figure 1A:
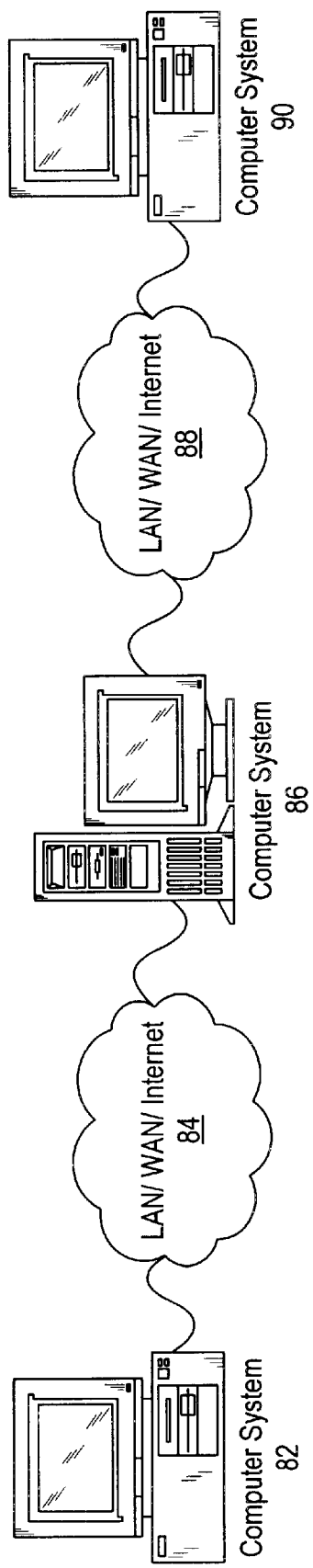
FIGS. 1A and 1B illustrate exemplary networked computer systems.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following are hereby incorporated by reference in their entirety as though fully and completely set forth herein:

U.S. patent application Ser. No. 09/185,161 titled "Data Socket System and Method for Accessing Data Sources Using URLs", filed Nov. 3, 1998, whose inventor was Paul F. Austin;

U.S. provisional Patent Application Serial No. 60/065,557 titled "Data Socket Client for Improved Data Access" filed Nov. 14, 1997, whose inventor was Paul F. Austin;

U.S. patent application Ser. No. 09/374,740 titled, "System and Method for Automatically Creating URLs for Accessing Data Sources and Data Targets" filed on Aug. 13, 1999, whose inventors were Paul F. Austin, David W Fuller, Brian H. Sierer, Kurt Carlson, Stephen Rogers and Chris Mayer;

U.S. patent application Ser. No. 09/737,527 titled, "System and Method for Configuring a GUI Element to Publish or Subscribe to Data," filed on Dec. 13, 2000, whose inventors were Paul F. Austin and Robert Dye.

U.S. patent application Ser. No. 09/737,528 titled, "System and Method for Automatically Configuring a Graphical Program to Publish or Subscribe to Data," filed on Dec. 13, 2000 whose inventor was Paul F. Austin;

U.S. patent application Ser. No. 09/737,639 titled, "System and Method for Automatically Configuring Program Data Exchange," filed on Dec. 13, 2000, whose inventor is Paul F. Austin;

U.S. Pat. No. 5,481,741 titled "Method and Apparatus for Providing Attribute Nodes in a Graphical Data Flow Environment," issued on Jan. 2, 1996.

Figure 1B:
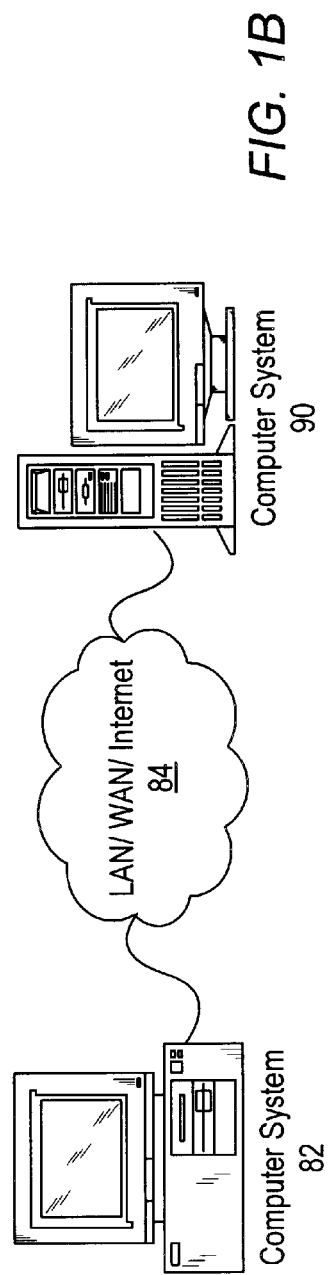

FIGS. 1A and 1B—Computer Systems Connected Via a Network

One embodiment of the present invention enables program users or developers to easily create a graphical program that exchanges or accesses data with/to/from a data source or target, e.g., another program or a device, including cases where the graphical program executes on a separate computer system from the data source/target. The present invention allows the user to place a node or icon in a graphical program that is operable during execution of the graphical program to access a data source/target.

FIGS. 1A and 1B illustrate exemplary networked computer systems. It is noted that FIGS. 1A and 1B are exemplary only and that, in various embodiments, the present invention may be used in any type of system, including a system with only one computer.

FIG. 1A illustrates an exemplary system in which a first computer system 82 is connected through a network 84 to a second computer system 86, and the second computer system 86 is connected through a network 88 to a third computer system 90. The computer systems 82, 86, and 90 can be any of various types, as desired. The networks 84 and 88 can also be any of various types, including the Internet, another type of WAN (wide area network), or a LAN (local area network), among others. The networks 84 and 88 may also be the same network.

The respective computer systems 82, 86, and/or 90 may execute graphical programs that operate as "writer programs" or "reader programs". In one embodiment, the first computer system 82 may store and/or execute a writer program that generates data, and the third computer system 90 may execute a reader program that uses the data generated by the first computer system 82. Either or both of the writer or reader programs may be graphical programs developed according to various embodiments of the methods described below. The computer system 86 may act as an intermediate server between the writer program and the reader program. For example, the intermediate server 86 may execute a server program (or process) with which the writer program and the reader program interface in order to exchange data. One embodiment of such a server program is referred to as a "DataSocket server".

Such an intermediate server program may not necessarily execute on a separate computer system from the writer and reader programs. For example, the computer system 82 may execute the writer program which may interface with a server program also executing on the computer system 82. In this case, a reader program may interface with the server program executing on the computer system 82 in order to receive the data generated by the writer program. For example, the reader program may execute on the computer system 90, e.g., as shown in FIG. 3B, or may execute on the same computer system 82. Alternatively, the writer program may execute on the computer system 82, and the server and reader programs may execute on the computer system 90.

The reader program may be a graphical program configured to subscribe to a data target to which the writer program writes data. In other words, the data target for the writer program may be a data source for the reader program. As described below, one embodiment of the present invention enables the program developer to easily associate a data source with a graphical program, by configuring the graphical program to include a data access node that interfaces with the data source, without the developer having to specify or write any other source code.

The writer program may be a graphical program configured to publish data to a data source from which the reader program receives data. In other words, the data source for the reader program may be a data target for the writer program. As described below, one embodiment of the present invention enables the developer to easily associate a data target with a graphical program, by configuring the graphical program to include a data access node that interfaces with the data target, without the developer having to specify or write any other source code.

It is noted that at least one of the writer or reader programs is a graphical program configured as described herein, wherein the graphical program includes a data access node as described herein that accesses a data source or data target. Thus, one or both of a writer program and reader program may implement one embodiment of the present invention, and each of the writer program and reader program may interface with various applications or programs which can publish or subscribe to data over a network but which do not utilize the present invention. Thus, the developer may configure data access from/to a data source/target using only a single node in a graphical program.

Figure 2A:
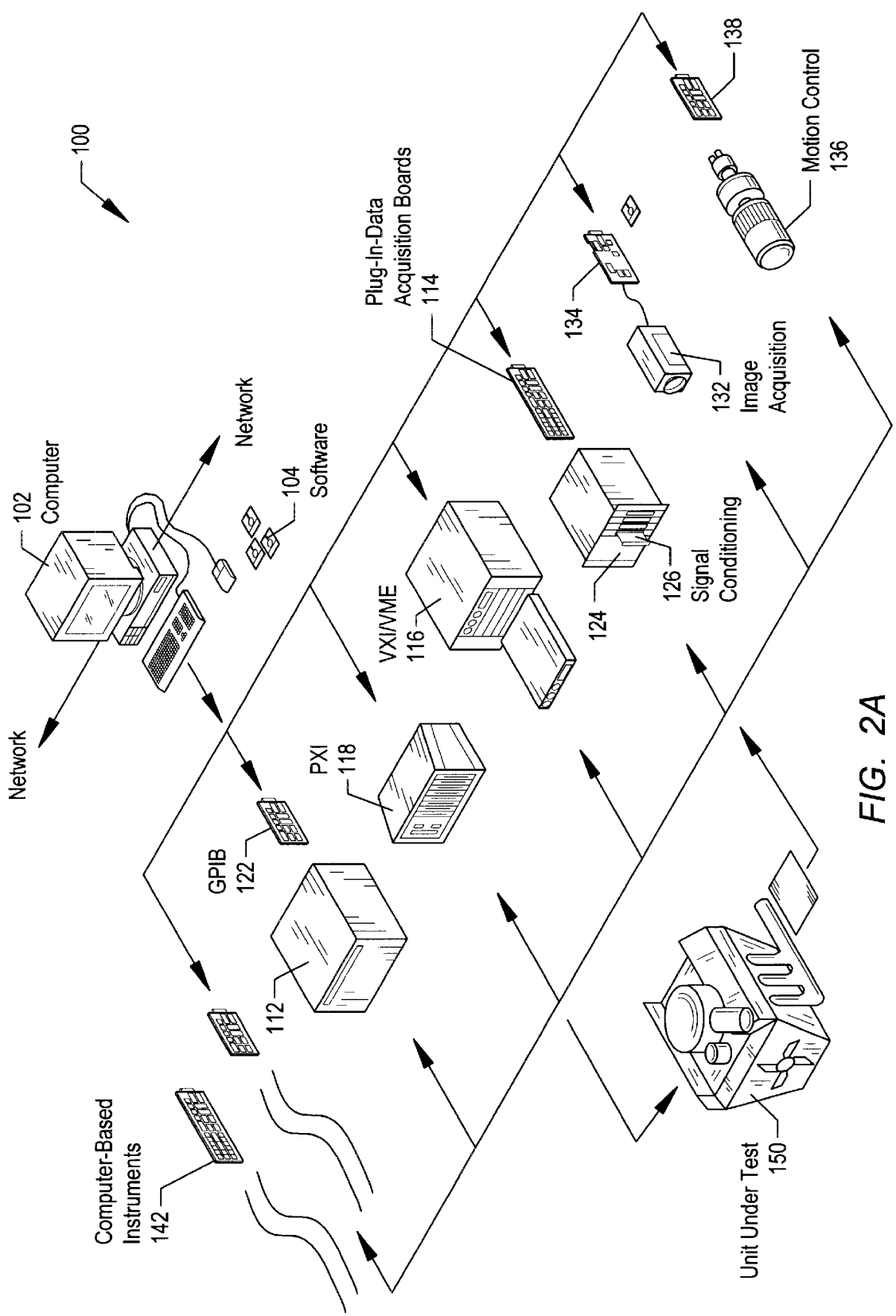
FIGS. 2A and 2B illustrate representative instrumentation and automation systems including various I/O interface options.
Figure 2B:
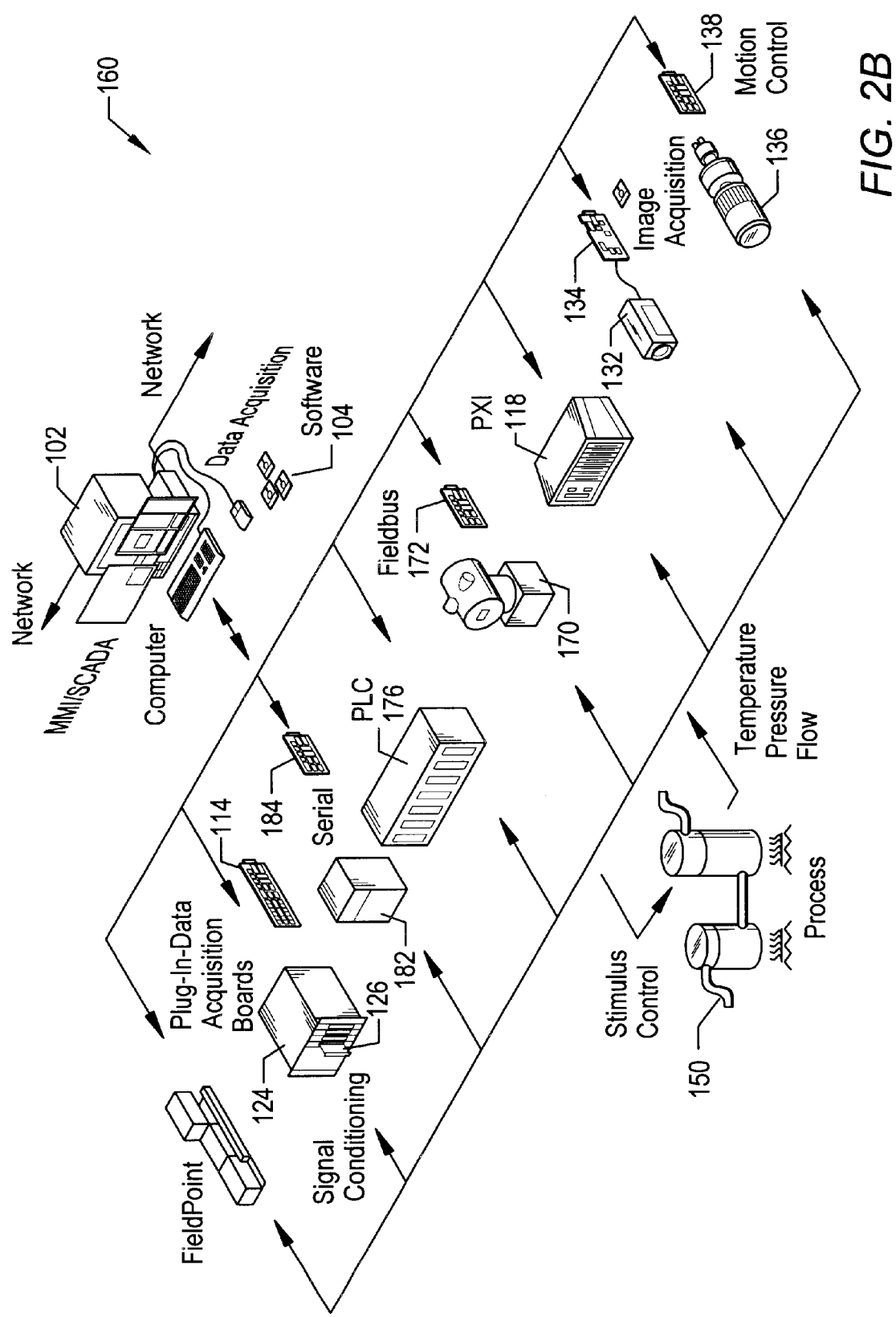

FIGS. 2A and 2B—Instrumentation and Industrial Automation Systems

Graphical programs may execute on any of various types of computer systems and may perform or control any of various types of operations, processes, or computations. In some embodiments, a graphical program may be utilized to perform an instrumentation or test and measurement application or an industrial automation application. FIGS. 2A and 2B illustrate exemplary systems for performing instrumentation applications and automation applications. An exemplary computer 102 having various types of instruments or hardware devices connected is illustrated. In various embodiments, the computer 102 may be any of various types of computer systems.

As described below, one embodiment of the present invention comprises a system and method for creating a graphical program that is operable to access data from/to data sources/data targets. According to the invention, a data access node may be included in a graphical program to access data from/to data sources/data targets. Thus, the graphical program may be easily created to acquire data from a data source and/or to publish data to a data target. In FIGS. 2A and 2B, a graphical program development system and/or a created graphical program may execute on the computer 102. Also, the graphical program may be downloaded to a hardware device connected to the computer 102 and may execute within the hardware device.

It is noted that FIGS. 2A and 2B are exemplary, and the present invention may be used with any of various types of computer systems. For example, in various embodiments, the graphical program development system and/or the created graphical program may execute on any of various types of computer systems and for any of various applications.

FIG. 2A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1, 2A and 2B, the computer system(s) 102 preferably includes a memory medium(s) on which software according to one embodiment of the present invention is stored. For example, the memory medium may store a graphical programming development environment and/or may store a graphical program created in the graphical programming development environment. Examples of graphical programming development environments include LabVIEW, DasyLab and DiaDem from National Instruments Corporation, VEE from Agilent, SoftWIRE from Measurement Computing, Simulink from The MathWorks, VisSim from Visual Solutions, SystemVIEW from Elanix, WiT from Coreco, Vision Program Manager from PPT Vision, Khoros from Khoral Research, and numerous others.

Figure 7:
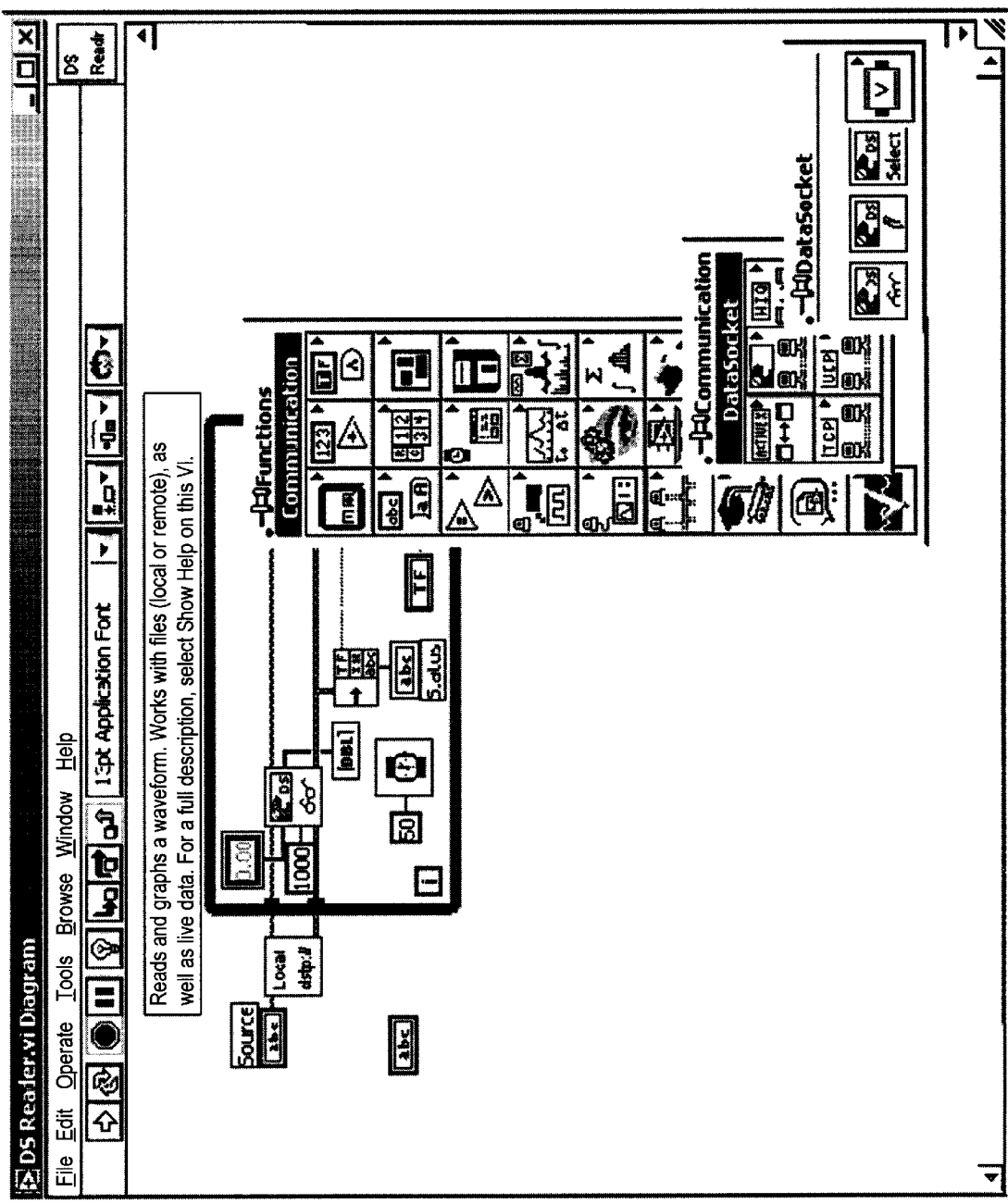
FIG. 7 illustrates a palette of data access nodes according to one embodiment.
Figure 8:
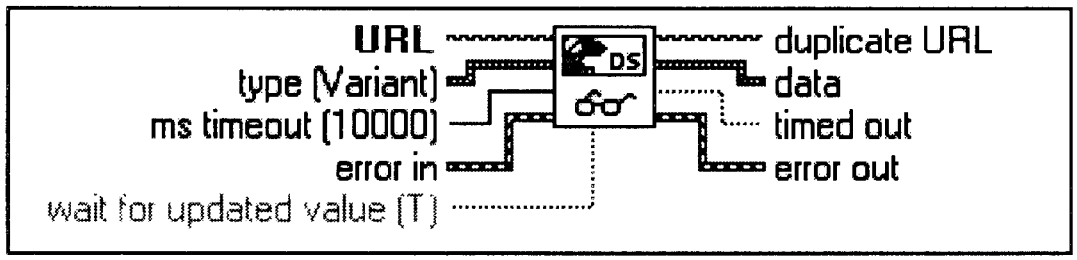
FIG. 8 illustrates connections or terminals for a DataSocket Read node.
Figure 9:
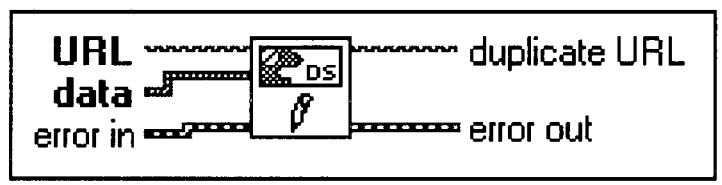
FIG. 9 illustrates connections or terminals for a DataSocket Write node.
Figure 10:
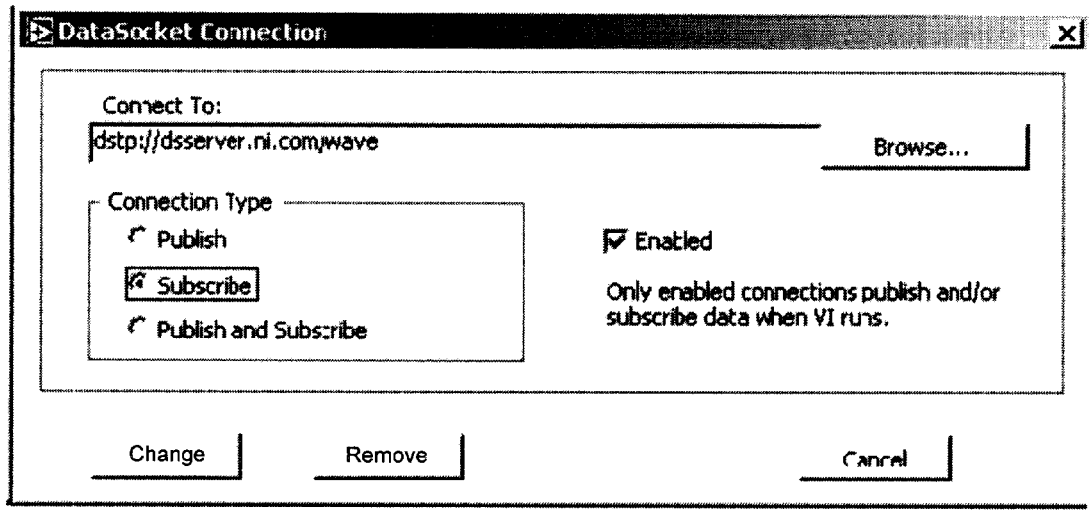
FIGS. 10–14 are screen shots illustrating exemplary dialog boxes for configuring a data access node.
Figure 11:
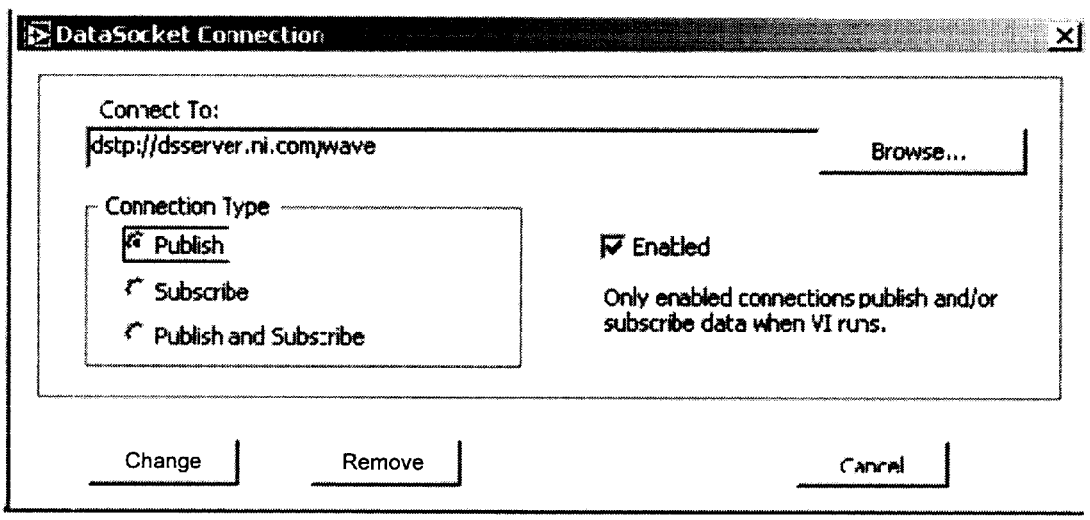

The graphical programming development environment may provide a plurality of different nodes or icons that may be arranged and connected to create a graphical program. The plurality of nodes may include one or more data access nodes for accessing data from data sources/targets. Exemplary data access nodes are shown in FIGS. 7, 8 and 9.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, programmable logic device, or other device. In general, the term "computer system" can be broadly defined to encompass any device having at least one processor that executes instructions from a memory medium, or which comprises programmable logic for executing a program or algorithm.

Figure 3:
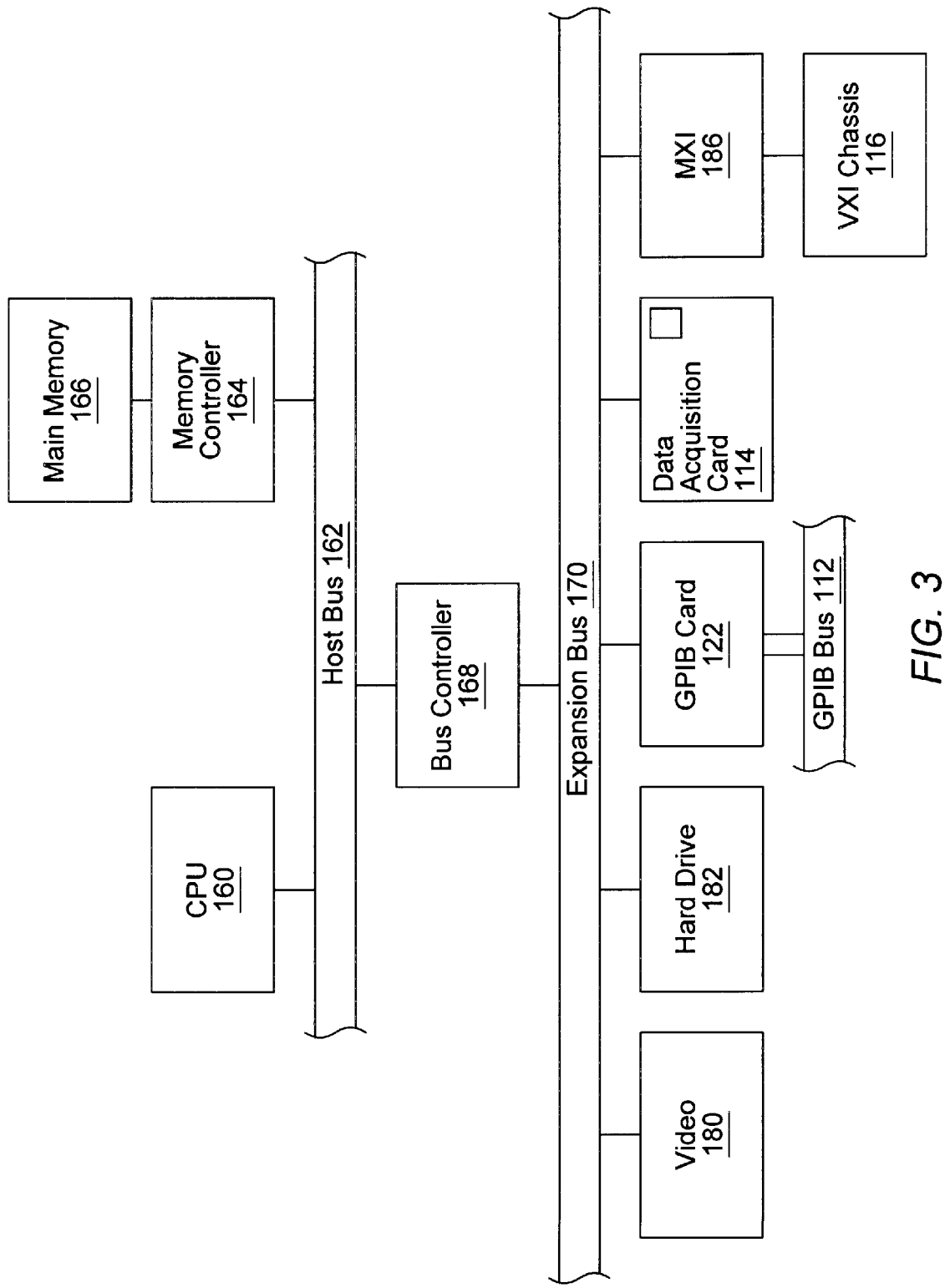
FIG. 3 is an exemplary block diagram of the computer systems illustrated in FIGS. 2A and 2B.

FIG. 3—Computer System Block Diagram

FIG. 3 is an exemplary block diagram of the computer systems illustrated in FIGS. 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention. The main memory 166 also stores operating system software as well as the software for operation of the computer system, as well known to those skilled in the art. The methods performed by the computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A) and a GPIB interface card 122 which provides a GPIB bus interface to the GPIB instrument 112 (of FIG. 2A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA; or a processor and memory, which may execute a real time operating system. According to one embodiment of the invention, a created graphical program may be downloaded and executed on the reconfigurable instrument 190. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIGS. 2A or 2B.

Figure 4:
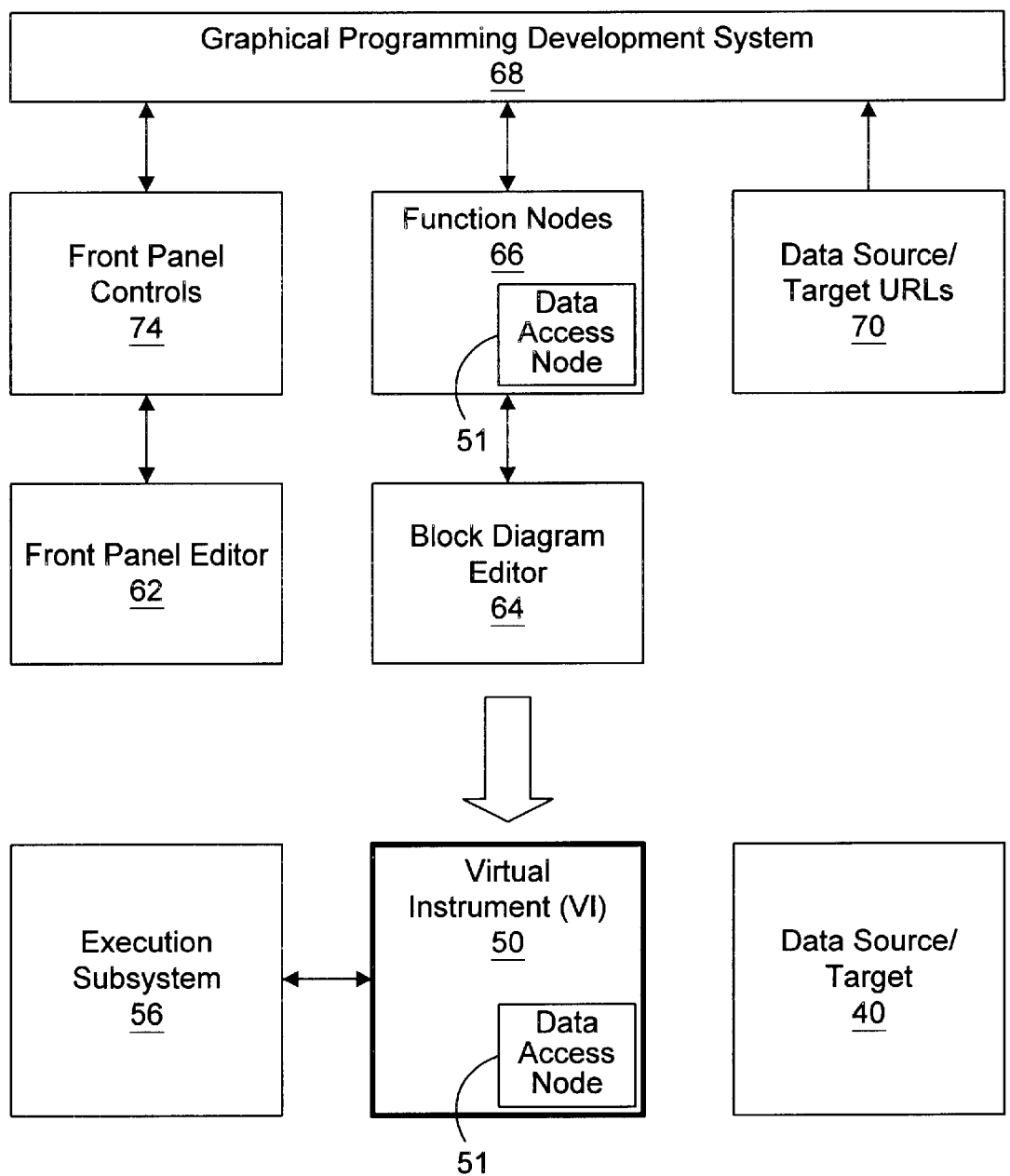
FIG. 4 is a block diagram of portions of the hardware and software of the computer systems illustrated in FIGS. 2A and 2B.

FIG. 4—Graphical Programming Environment

FIG. 4 is a block diagram illustrating one embodiment of a graphical programming development system usable to create graphical programs that access data from/to data sources or data targets. Graphical programming may also be referred to as iconic programming and a graphical program may be referred to as an iconic program. As used herein, the term "access" is intended to include acquiring or reading data as well as publishing or writing data. It is noted that the elements of FIG. 4 are exemplary only, and other graphical programming development systems may differ in various ways.

In one embodiment, a programmer may employ a front panel editor (or user interface editor) 62 and a block diagram editor 64 of a graphical programming development system to produce a graphical program. In other embodiments, the graphical programming development system may include only a block diagram editor 64, i.e., may not include a front panel editor 62. In these embodiments, the front panel or user interface may be inherently specified by the block diagram or by another program.

In an instrumentation, automation or modeling/simulation application, the graphical program may be referred to as a virtual instrument (VI) 50. The VI 50 may include one or more nodes or blocks that may be connected or coupled together as specified by the user. As shown, a data access node 51 may be included in the VI 50, wherein the data access node 51 is operable to access data from data sources and/or data targets during execution of the VI 50. The VI 50 may be executed by an execution subsystem 56 of the graphical programming development system to access a data source and/or data target.

The data source and/or data target may be a device that is directly connected to the computer. For example, where the graphical program executes in computer 102, the device may be any of those illustrated in FIGS. 2A and 2B. The device comprising the data source and/or data target may also be remotely coupled to the computer 102 that executes the graphical program. In other words, the computer 102 that executes the graphical program may be coupled through a network to the device that comprises the data source and/or data target. Thus the computer 102 that executes the graphical program may be located in a first location anywhere in the world, and the device comprising the data source and/or data target may be located in a second location anywhere in the world. The device that comprises the data source and/or data target may be any of various types, regardless of whether the device is directly connected to the computer or is coupled to the computer 102 through a network. Thus the device may be a second computer system, any of the devices or instruments illustrated in FIGS. 2A and 2B, a multimedia device (e.g., a video or audio device), or any other type of device capable of providing data as a data source or receiving published data as a data target.

The graphical programming development system may provide various front panel controls or graphical user interface (GUI) elements 74. The front panel editor 62 may be operable to generate a front panel or GUI for the VI 50, using one or more of the front panel controls 74. The user interface or panel elements 74 may be comprised in a single window or may be comprised in separate windows, or may be contained in the block diagram window.

The graphical programming development system may also provide various function nodes 66 (also referred to as nodes or icons) that may be included, using the block diagram editor 64, in graphical programs to perform various functions. The data access node 51 is one example of a function node or nodes. Other examples of graphical program nodes include those available in the LabVIEW software product available from National Instruments Corp. The data access node 51 may be included in a graphical program or VI 50 as shown.

FIG. 7 illustrates a palette including various function nodes related to data access, as provided by one embodiment of a graphical programming development system. In one embodiment, the data access nodes comprise a data read node, a data write node, and a Select URL node. More specifically, in the embodiment shown in FIG. 7, the nodes comprise a DataSocket Read node, a DataSocket Write node, and a DataSocket Select URL node or VI. In one embodiment a single data access node may perform the functionality of accessing data sources or data targets, with no need for other nodes to perform this function. Thus in this embodiment the single data access node may be configured as a read node or a write node.

The graphical programming development system may utilize data source/data target location information or descriptions 70 stored in the computer to reference data sources and/or data targets. In one embodiment, the data source/data target location information 70 may include URLs (Uniform Resource Locators) which are used to access or locate devices on the Internet. In another embodiment, the location information 70 may take other forms. In another embodiment, data source/data target location information 70 is not pre-stored in the computer 102, but rather is entered by the user during creation of the graphical program.

The execution subsystem 56 may execute executable instructions constructed from a block diagram and/or front panel of the VI 50. For more information about one embodiment of the execution subsystem 56, please refer to U.S. Pat. No. 5,481,741.

When the VI 50 is executed, the data access node 51, included in VI 50, may access a data source/target. Stated another way, the data access node 51 is executable to access (read or write) a data source or target, wherein the data source/target may be connected to the computer in which the graphical program executes, or the data source/target may be connected to the computer over a network.

The graphical programming development system of FIG. 4 provides a number of benefits for the development of graphical programs that access data sources/targets. These benefits include the simple inclusion of a node in the program for data source/target access, without the need to handle network protocols, data conversions, etc. This may result in the reduction of the development time required to create the graphical program, as well as reduction of the number of code defects in the graphical program. Another benefit is the simplicity of programming. The simplicity makes the development of a graphical program, such as an instrumentation control program, more practical for a larger number of people, e.g., those who might not have the skills, or resources to develop the skills, to develop programs according to more conventional text-based methods. Also, in one embodiment the graphical programming development system may utilize an object-oriented system design, which allows for class propagation, class checking, and type checking in the graphical programming environment.

Figure 5:
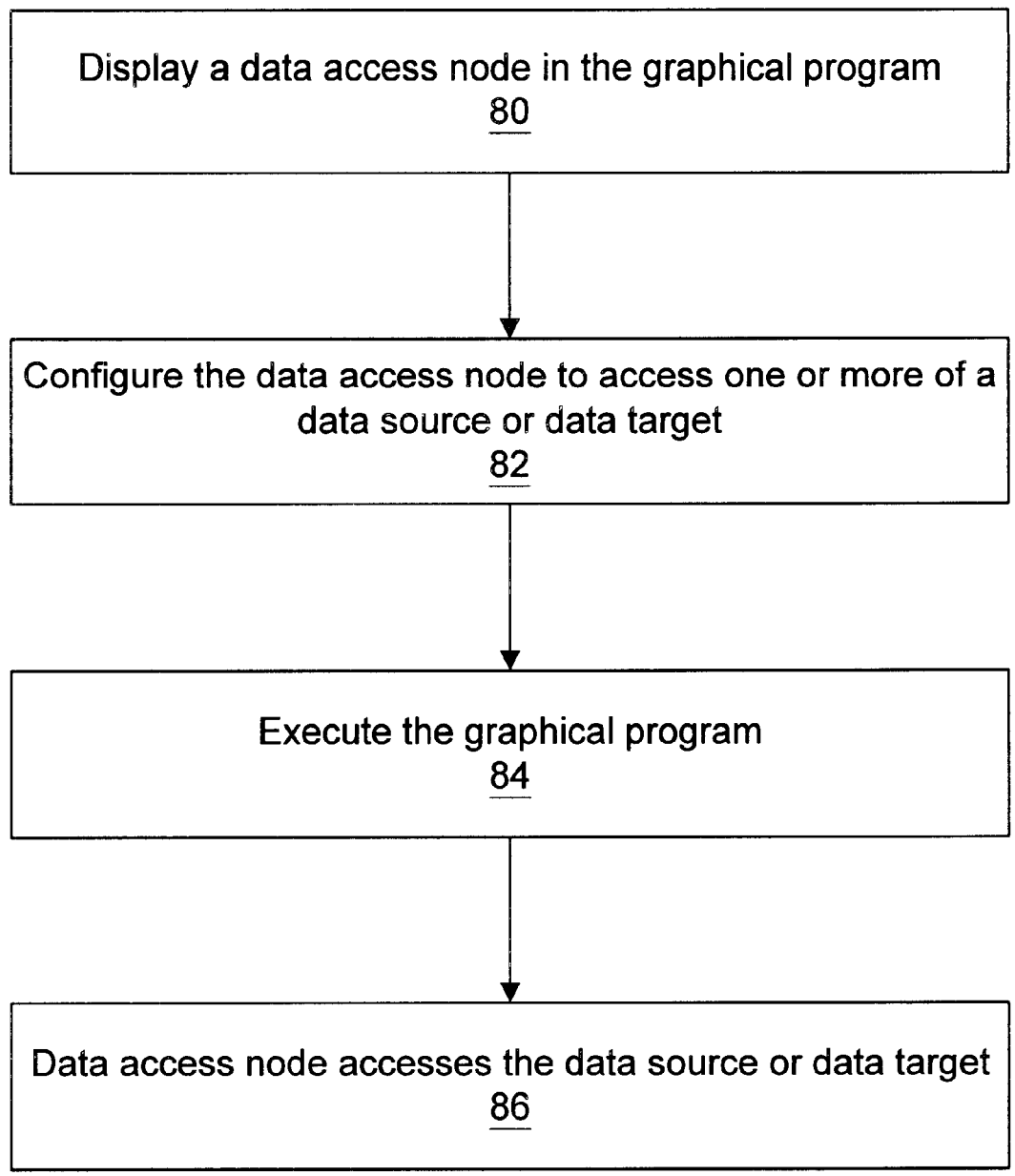
FIG. 5 is a flowchart diagram illustrating one embodiment of a method for creating and executing a graphical program generating a second graphical program based on a first graphical program.

FIG. 5—Creating a Graphical Program that Accesses a Data Source/Target

FIG. 5 is a flowchart diagram illustrating one embodiment of a method for creating a graphical program operable to access a data source/target.

In step 80, a data access node may be displayed in the graphical program. For example, as described above, a graphical programming development system may provide various nodes for inclusion in the block diagram of a graphical program. Thus, a user may display the data access node in the graphical program's block diagram, e.g., by selecting the data access node from a palette or menu.

In step 82, the data access node may be configured to access one or more of a data source or a data target. The data source or data target may be any of various types. For example, the data source or data target may be a file, a server (or resource associated with a server), or any type of device, such as instrument or automation device, etc., and may be located on the host computer system of the graphical program or on a remote computer system. As a further example, the user may specify a server, such as a HyperText Transfer Protocol (HTTP) server, a File Transfer Protocol (FTP) server, an OLE for Process Control (OPC) server, a Simple Network Management Protocol (SNMP) server, or a type of server referred to as a DataSocket server. The developer may also specify a file as the data source or data target. In the preferred embodiment, the data source or data target is specified by a uniform resource locator (URL).

The configuration in step 82 may be performed in any of various ways. In one embodiment, the graphical programming development system may provide a dialog box or other type of user interface for performing this configuration. For example, the user may input a Uniform Resource Locator (URL) of the data source/target. In another embodiment, the user may select a data source/target from a list of possible data sources/targets. Example dialog boxes for configuring the data access node are described below.

In another embodiment, the user may drag an icon which represents the data source/target onto the data access node, thereby configuring the data access node with the associated data source/target information. In yet another embodiment, the user may cause a node or icon which represents the data source/target to be displayed in the graphical program, and then the user may connect this node or icon to the data access node. Various other methods may be used to associate the data source/target information with the data access node. In another embodiment, the user may select or create the data source/target configuration information, and as a result the data access node may be automatically or programmatically included in the block diagram.

As noted above, the data source or data target user input information may be received in any of various ways. Typically, this information is received during development or editing of the graphical program. For example, a graphical programming environment may provide an editor or window for including various nodes or block diagram elements in a block diagram and connecting the nodes (block diagram elements) such that they visually indicate functionality of the graphical program. The nodes and other elements (e.g., user interface terminals) displayed on the block diagram are referred to herein as graphical "source code".

In various embodiments, the user input specifying the data source or data target may be received as user input to the block diagram. In one embodiment, the data source or target information may not be initially associated with any particular node or element of the block diagram. For example, the developer may drag and drop an icon representing the data source or target, such as a URL icon or file icon, onto the block diagram window, or the developer may paste data source or target information stored on the clipboard, e.g., a URL, into the block diagram.

In another embodiment, the developer specifying the data source or target information may comprise associating the data source or target information with a particular block diagram element. For example, the developer may drag and drop a URL icon onto a specific node or node terminal. Also, the developer may invoke a configuration command from the context of a particular block diagram element, e.g., by right-clicking on a block diagram node in order to display a user interface dialog for configuring a data connection for the node to a data source or data target.

In response to receiving the URL or other information, the method may operate to present the developer with a user interface, e.g., a user interface dialog, for providing further information. A URL by itself may not designate the referenced resource as either a data source or target. Thus, the dialog may enable the developer to specify whether to treat the referenced resource as a data source or a data target. Also, in one embodiment the resource may be treated as both a data source and a data target, as described below. For example, in one embodiment, the user interface dialog enables the developer to select one of a "Publish", "Subscribe", or "Publish and Subscribe" option.

Once the necessary information regarding the data source or target has been received, the data access node is configured. In one embodiment, the configuration information may be received first in step 82, and then the data access node may be manually or programmatically generated or included in the graphical program.

In step 82, the data access node may also be connected or wired to other portions of the graphical program. For example, if data is to be written to a data target, a data value may be wired or connected from another part of the graphical program into an input terminal of the data access node. The data access node can then receive this data from the other part of the graphical program and write this data to the data target. If data is to be obtained from a data source, an output terminal of the data access node may be wired or connected to another part of the graphical program. The data access node can then obtain data from the data source and provide this data to the other part of the graphical program, which may process or directly display the data. Also, as described above, in one embodiment, specifying which data source/target to access may comprise connecting the data access node to another node, such as a data source/target reference node or icon.

Thus in steps 80 and 82 the user may arrange a plurality of nodes or icons on the display to assemble the graphical program or iconic program. The nodes may be interconnected so as to specify one or more of data flow, control flow, and/or execution flow among the nodes in the program. The nodes may also be connected in a "signal flow" format, wherein signal flow is considered a subset of data flow.

In step 84, the graphical program may be executed.

In step 86, the data access node may access the data source/target, as configured in step 82. In other words, including the data access node in the graphical program and configuring the data access node to access the specified data source/target causes the inclusion of certain executable code in the graphical program, such that when this code is executed during execution of the graphical program, the specified data source/target is accessed.

During program execution, the data access node in the graphical program is operable to automatically, i.e., programmatically, determine and use an appropriate protocol for interfacing with the data source/target, such as HTTP, FTP, DSTP, SNMP, etc. The data access node may also be operable to automatically convert the data to a format understandable by the graphical program. In one embodiment, the data access node may be operable to automatically convert the data to a generic format. In another embodiment, the data access node may be operable to automatically convert the data to a self-describing format.

If the user configured the data access node to subscribe to data from a data source, then the data access node may connect to or open the data source, using an appropriate protocol or access method, and receive data from the data source. The data access node may then convert the received data to a format useable by the graphical program, or to a generic format. For example, the data access node may be operable to receive the data in a self-describing format and then convert the data to a format used by a subsequent node in the program. In another embodiment, the data access node may be operable to automatically convert the data to a self-describing format for use by other nodes in the graphical program. This data may then be provided to other portions of the graphical program to which the data access node is connected. The data may then be processed according to the functionality of the graphical program.

If the user configured the data access node to publish data to a data target, then the data access node may connect to or open the data target, using an appropriate protocol or access method. The data access node may receive data from a prior node in the graphical program, or from a user interface element, and convert the data to a format useable by the data target, or to a generic format, or to a self-describing format. The data access node may then publish or write the data to the data target.

Figure 6:
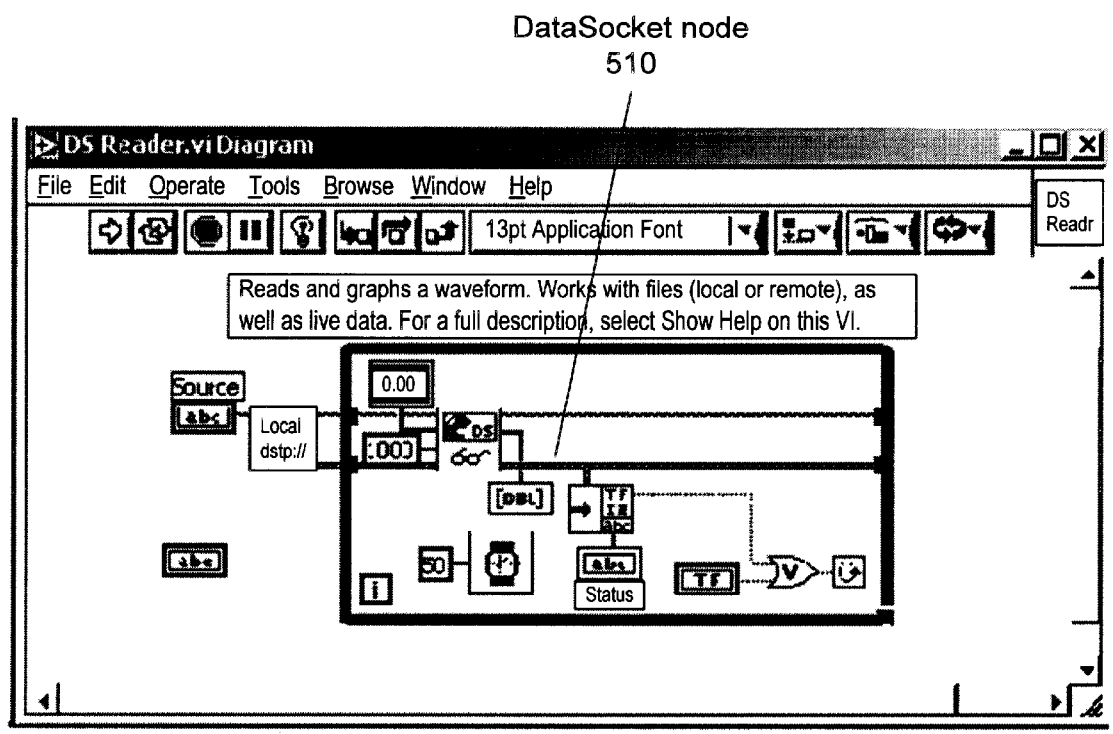
FIG. 6 illustrates an exemplary graphical program which includes a data access node.

FIG. 6—Exemplary Graphical Program

FIG. 6 illustrates an exemplary graphical program that includes one embodiment of a data access node 510 according to one embodiment of the invention. In this example, the data access node 510 is a data access read node for reading data from a data source. Also, in this embodiment, the data access node 510 is a DataSocket node. This DataSocket node is configured to connect and read data from a data source. In this particular example, the data source is represented by an icon that includes the label "Local dstp://".

FIG. 7—Data Access Node Palette

FIG. 7 illustrates a palette containing one or more types of data access nodes according to one embodiment of the invention. As shown, the palette comprises a data access read node, wherein the "reading glasses" image on the icon or node symbolizes a read node. The palette also comprises a data access write node, wherein the "pencil" image on the icon or node symbolizes a write node. In this exemplary embodiment, the data access read and write nodes are DataSocket read and write nodes comprised in the LabVIEW graphical programming environment. In an alternate embodiment, a single data access node may be used for both reads and writes. Also, the data access node(s) may use other data access technologies than Data Socket, as desired.

The palette also comprises a data access Select node for selecting a data source or a data target. The Select Node is similar to a standard file dialog and allows the user to select an existing source or server URL, or browse for a data source on a local or remote computer or device.

FIG. 8—DataSocket Read Node

FIG. 8 illustrates the connections for the DataSocket Read node shown in the palette of FIG. 7. The DataSocket Read icon reads the data from the connection specified in URL and returns the data, which can be published to another front panel object or passed to another function or node. The following describes the connections or terminals for the DataSocket Read node or icon.

"URL" identifies the data source to read.

"type (Variant)" specifies the type of data to be read and defines the type of the data output terminal. The default type is a Variant, which can be any type.

"ms timeout" specifies how long to wait for a value update. This time is ignored if "wait for updated value" is false and an initial value has arrived.

"error in" is a cluster that describes the error status before this node executes. If error in indicates that an error occurred before this node was called, this node may choose not to execute its function, but just pass the error through to its error out cluster. If no error has occurred, then this node executes normally and sets its own error status in error out. Error handler nodes may be used to look up the error code and to display the corresponding error message. Using "error in" and "error out" clusters is a convenient way to check errors and to specify execution order by wiring the error output from one node to the error input of the next.

"status" is TRUE if an error occurred before this node was called, or FALSE if not. If status is TRUE, code is a non-zero error code. If status is FALSE, code can be zero or a warning code.

"code" is the number identifying an error or warning. If status is TRUE, code is a non-zero error code. If status is FALSE, code can be zero or a warning code. Error handler nodes may be used to look up the meaning of this code and to display the corresponding error message.

"source" is a string that indicates the origin of the error, if any. Usually source is the name of the node in which the error occurred.

"wait for updated value" waits for an updated value when true. If the value has been updated since the last read, the function returns immediately. Otherwise, the function waits "ms timeout" milliseconds for an update. If an update does not occur in the timeout period, the current value is returned and the "timed out" result is true. When false, the function returns the current value of the data. The timeout is only used if no value has yet arrived.

"duplicate URL" is the URL that specifies the DataSocket connection.

"data" is the result of the read. If the function times out, the value returned is the same as the value that was last read. If the function times out and nothing has been read or the type of the data is incompatible, the value of 0, empty, or their equivalent will be returned.

"timed out" returns TRUE if the function timed out waiting for an update or an initial value.

"error out" is a cluster that describes the error status after this node executes. If an error occurred before this node was called, error out is the same as error in. Otherwise, error out shows the error, if any, that occurred in this node. Error handler nodes may be used to look up the error code and to display the corresponding error message. Using error in and error out clusters is a convenient way to check errors and to specify execution order by wiring the error output from one node to the error input of the next.

"status" is TRUE if an error occurred, or FALSE if not. If status is TRUE, code is a non-zero error code. If status is FALSE, code can be zero or a warning code.

"code" is the number identifying an error or warning. If status is TRUE, code is a non-zero error code. If status is FALSE, code can be zero or a warning code. Error handler nodes nay be used to look up the meaning of this code and to display the corresponding error message.

"source" is a string that indicates the origin of the error, if any. Usually source is the name of the node in which the error occurred.

FIG. 9—DataSocket Write Node

FIG. 9 illustrates the connections for the DataSocket Write node shown in the palette of FIG. 7. The DataSocket Write node writes data to the connection specified in URL. The following describes the connections or terminals for the DataSocket Write node or icon.

"URL" specifies where the data is written.

"data" is the data written to the DataSocket connection.

"error in" is a cluster that describes the error status before this node executes. If error in indicates that an error occurred before this node was called, this node may choose not to execute its function, but just pass the error through to its error out cluster. If no error has occurred, then this node executes normally and sets its own error status in error out. Error handler nodes may be used to look up the error code and to display the corresponding error message. Using "error in" and "error out" clusters is a convenient way to check errors and to specify execution order by wiring the error output from one node to the error input of the next.

"status" is TRUE if an error occurred before this node was called, or FALSE if not. If status is TRUE, code is a non-zero error code. If status is FALSE, code can be zero or a warning code.

"code" is the number identifying an error or warning. If status is TRUE, code is a non-zero error code. If status is FALSE, code can be zero or a warning code. Error handler VIs may be used to look up the meaning of this code and to display the corresponding error message.

"source" is a string that indicates the origin of the error, if any. Usually source is the name of the node in which the error occurred.

"duplicate URL" is the URL that specifies the DataSocket connection.

"error out" is a cluster that describes the error status after this node executes. If an error occurred before this node was called, "error out" is the same as "error in". Otherwise, "error out" shows the error, if any, that occurred in this node. Error handler nodes may be used to look up the error code and to display the corresponding error message. Using error in and error out clusters is a convenient way to check errors and to specify execution order by wiring the error output from one node to the error input of the next.

"status" is TRUE if an error occurred, or FALSE if not. If status is TRUE, code is a non-zero error code. If status is FALSE, code can be zero or a warning code.

"code" is the number identifying an error or warning. If status is TRUE, code is a non-zero error code. If status is FALSE, code can be zero or a warning code. Error handler nodes may be used to look up the meaning of this code and to display the corresponding error message.

"source" is a string that indicates the origin of the error, if any. Usually source is the name of the node in which the error occurred.

FIGS. 10—14: Dialog Boxes for Configuring a Data Access Node

FIGS. 10–14 illustrate exemplary dialog boxes for configuring a data access node according to one embodiment. For example, when the user desires to configure the data access node, e.g., when the user selects the data access node for configuration, the dialog box illustrated in FIGS. 10 or 11 may be displayed, and the data access node may be configured according to the dialog box illustrated in FIGS. 10 or 11.

Figure 12:
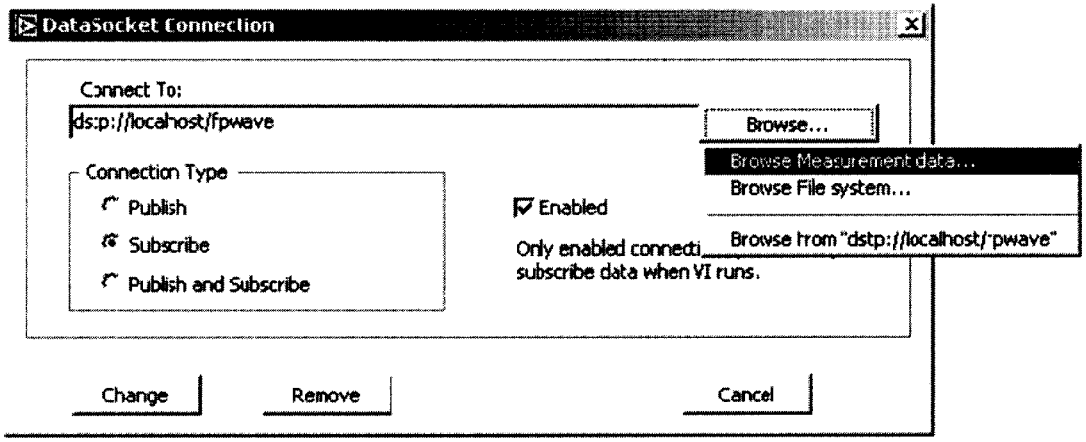
Figure 13:
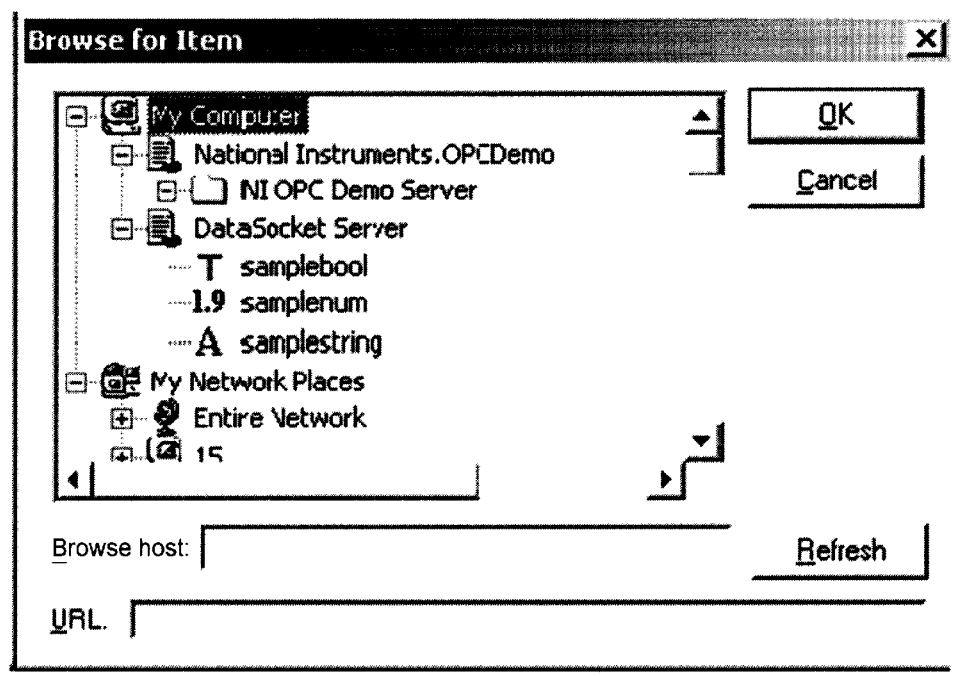

In another embodiment, as shown in FIG. 12, the dialog box may include a "Browse" button enabling the developer to choose a data source or target via a graphical user interface. In this example, the user can choose to browse the file system of the host computer, which may cause a file dialog box may be displayed. As shown, the user may also choose to browse measurement data. For example, in one embodiment, the user may be able to configure a data access node to subscribe to a hardware device as a data source or publish data to a hardware device data target. FIG. 13 illustrates a dialog box that may appear when the user selects "Browse Measurement data". This dialog box displays various data sources and targets associated with hardware instruments connected to the computer.

The dialog box of FIG. 13 also lists OPC servers available to the host computer. OPC (Object Linking and Embedding (OLE) for Process Control) is built on Microsoft ActiveX and Distributed Component Object Model (DCOM) technology. OPC servers and clients exchange real-time information among a variety of systems. OPC establishes an open industry standard for plug-and-play interoperability among disparate automation devices, systems, and software.

The user can configure a data access node to connect to an OPC Server in the same way as any other data source. A URL identifies the OPC server item. URLs that address OPC servers start with opc: and include the following parts:

//machine_name [optional]—Identifies the computer on which the OPC server is installed.

/server_name—Specifies the OPC server to connect to.

/item_name—Specifies the OPC item on the specific OPC server.

UpdateRate=n [optional]—Specifies in milliseconds how often the OPC server should check the device for new values.

DeadBand=n [optional]—Specifies what percentage change is required before the server notifies your application of a value change.

The following is an example of a URL that reference the National Instruments OPC test server installed with the LabVIEW application: opc://machine.ni.com/National Instuments.OPCTest/item1?UpdateRate= 1000&DeadBand=10

As described in the above-incorporated U.S. patent application Ser. No. 09/374,740, titled "System and Method for Automatically Creating URLs for Accessing Data Sources and Data Targets", in one embodiment, URLs for accessing data sources and targets may be automatically generated. Various hardware devices, hardware device channels, OPC servers, etc., may be referenced by these URLs. Thus, when a user selects a data source or target associated with a hardware device from the dialog box of FIG. 13, the "Connect To" field of FIG. 12 may be populated with a URL corresponding to the data source or target. The URL may include configuration information for a device. Thus, when a program having a data access node configured with a data connection to a hardware device data source or target executes, the device may be automatically configured.

Figure 14:
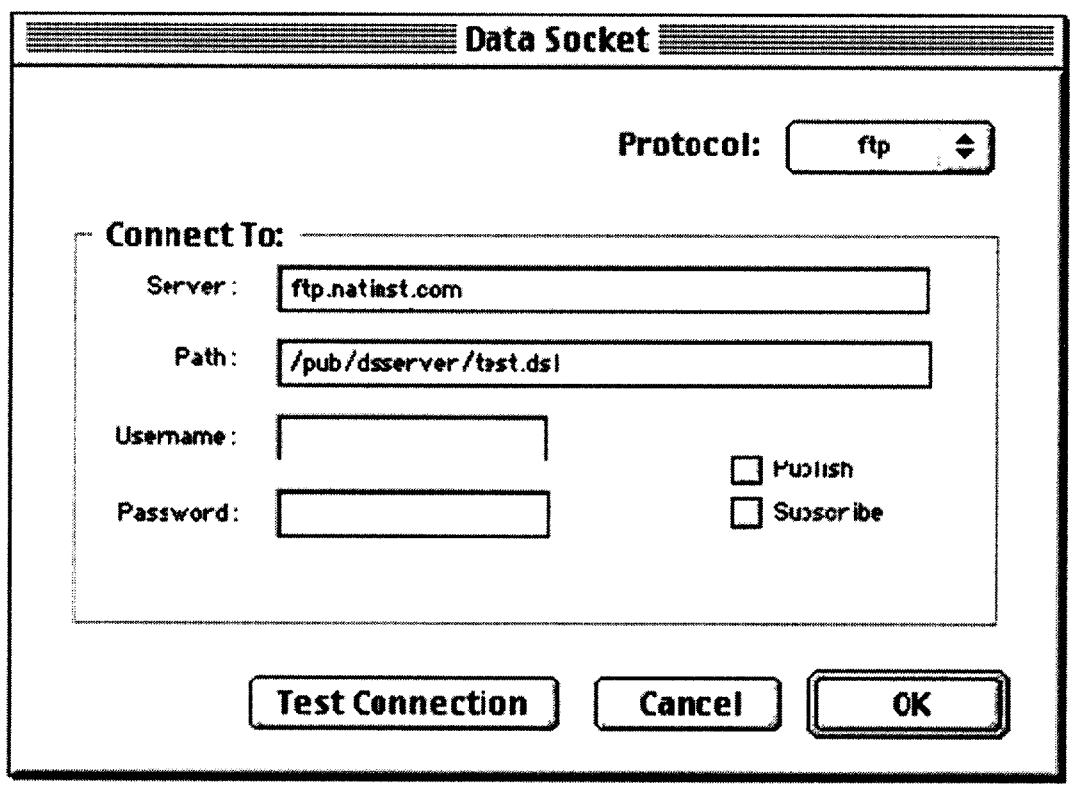

FIG. 14 illustrates an alternative embodiment of a dialog box for specifying data connection information. As shown in FIG. 14, the dialog box may include a "Protocol" control allowing the user to specify a protocol to use, such as "HTTP", "FTP", etc. Other fields in the dialog box may change appropriately, depending on the selected protocol. For example, in FIG. 14 the user selected the FTP protocol, and the dialog box displays fields for entering a username and password for connecting to the FTP server.

FIG. 14 also illustrates a "Test Connection" button. This may enable the user to interactively test the connection to a data source or target during creation of the block diagram or graphical program, i.e., before program execution. For example, this may help to detect any errors in the specified hostname or path of a data source or target, any network connection problems, etc.

DataSocket

In one embodiment, as noted above, the data access node in a graphical program configured as described above may comprise or utilize "DataSocket" technology for interfacing with the data source or target. DataSocket provides a single, unified, end-user application programming interface (API) for connecting to data from a number of sources, such as local files, files on FTP or Web servers, and data items on OPC Servers. A DataSocket application specifies the data location by using a familiar networking standard, the URL. Just as a Web browser uses a URL to connect to a Web page, a DataSocket application uses a URL to connect to data. In addition, the DataSocket Transfer Protocol connects a DataSocket application to live data by specifying a connection to a DataSocket Server. The DataSocket Server manages most of the networking tasks for the developer or user.

With the DataSocket Server, a lightweight, stand-alone component or object, programs using DataSocket can broadcast live data, such as measurement data, at high rates across a network such as the Internet to multiple remote clients concurrently. These client applications use DataSocket to subscribe to the live data. Because the DataSocket Server is a stand-alone component, it simplifies network (TCP/IP) programming by automatically managing connections to clients and automatically converting data to and from the stream of bytes sent across the network. The user does not have to write the parsing code. The DataSocket Server can run on any computer on a network, which improves performance and provides security by isolating the Web connections from other applications.

Various DataSocket APIs are provided so that various types of programming environments may interface with a DataSocket Server for data exchange. For example, as described here, a DataSocket node may be included in the block diagram of a graphical program.

With conventional technologies such as TCP/IP, the developer would have to write code to convert data to an unstructured stream of bytes in the broadcasting application, as well as code to parse the stream of bytes back into its original form in subscribing applications. DataSocket, however, transfers data in a self-describing format that can represent data in an unlimited number of formats, including strings, scalars, Booleans, and waveforms. The DataSocket read and write operations transparently convert data to and from the underlying byte streams, eliminating the need to write complicated parsing code. DataSocket uses a protocol referred to as the DataSocket Transport Protocol (DSTP) to send data to and receive data from a DataSocket server.

With DataSocket the data source or target name is in the form of a URL. For example, in the URL, "dstp://localhost/wave", the "dstp://" indicates that the DataSocket application is connecting to a DataSocket Server using the DataSocket Transfer Protocol for live data. The "localhost" indicates that the DataSocket Server is running on the local machine; if the DataSocket Server were running on another machine, the user would replace localhost with the machine name or IP address. The "wave" is the data item name on the server. This is an arbitrary name which identifies the location of the data on the DataSocket Server. A single DataSocket Server can handle numerous data items.

More information on DataSocket and the DataSocket Server may be obtained in the above patent applications incorporated by reference.

DataSocket Transfer Protocol

A brief description of the DataSocket Transfer Protocol as used in one embodiment follows:

Message Formats:

Messages may be made up of packets of bytes comprising the following parts.

1. [message_length] A 4-byte integer field (in little-endian) describes the length of the entire message in bytes, including the 4-byte header.
2. [message_format] A 2-byte enumeration that describes the binary format of the data in the message_data field. Types include 1,2,4,8 byte integers, 4 & 8 byte floating-point numbers, ASCII and UNICODE strings. There are two special enumeration values. The first, "array", is followed by a nested message whose type field describes the array element type. The second special enumeration value "cluster" is followed by a two byte count and then by series of nested messages each describing one element of data that follows in the message_data section.
3. [message_data] Optional data in the format identified by the second field. In the case of arrays and clusters, there may be more than one value.

Message Types:

Kinds of messages:

Messages are sent as a block of values stored in the "cluster" format described above. The first element is the op code, subsequent elements are parameters, if necessary, for the specific op code.

1. Greeting exchange, protocol version exchange.
2. Request from client to subscribe to an item maintained by the server. Items are identified by a ASCII or UNICODE string.
3. Request from client to server to cancel any existing subscription on an item
4. Request from client to server to get an item's value
5. Request from client to server to set an item's value
6. Notification from server to client of an item's value. This may be in response to a subscription or a specific request for the value.

7. Notification from server to the client that the served is being shut down.
8. Notification from client to server that it is closing the connection. (This implies canceling any subscriptions made on the connection.)

Message opcodes:
Opcodes used:
- kCWDS_Connect,
- kCWDS_Disconnect,
- kCWDS_SetVersion,
- kCWDS_Logon,
- kCWDS_Subscribe,
- kCWDS_Unsubscribe,
- kCWDS_SetValue,
- kCWDS_GetValue, Message Sequences:
Sequences:

With the exception of the greeting messages, the client, or server never waits for a reply. Either the client or server can cancel the session at any time by sending the appropriate "disconnect" message.

Protocol functions:
Functions:

Getting, setting, and subscribing to values of items stored in a database maintained by a server.

Name of the port:
nati-dstp

DataSocket handles all tasks of converting data and data attributes from their native application format (strings, arrays, Booleans, etc.) into a TCP/IP suitable format, referred to as the Flex Data format, and converting back from the Flex Data format on the client end. Because the DSTP network communication only requires TCP/IP support, the DataSocket can be used to share information through many different types of networks, including the Internet. The DataSocket can be used to share information between machines located on opposite sides of the world using local Internet service providers. Of course, DataSocket and the DataSocket server can be used on a local Windows network or in a single stand-alone computer.

Figure 15:
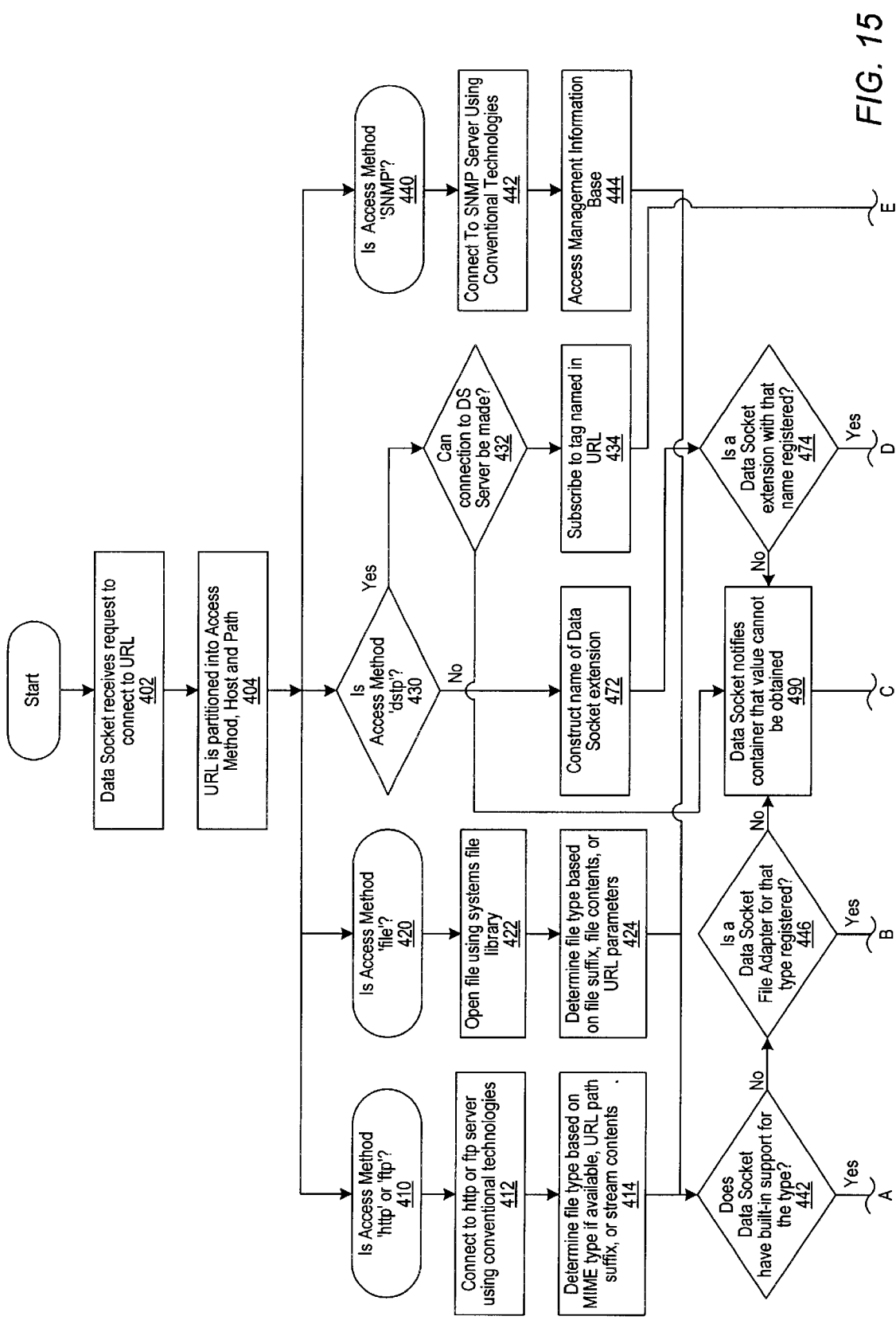
FIG. 15 are a more detailed flowchart diagram illustrating operation of a data access node according to one embodiment.
Figure 15:
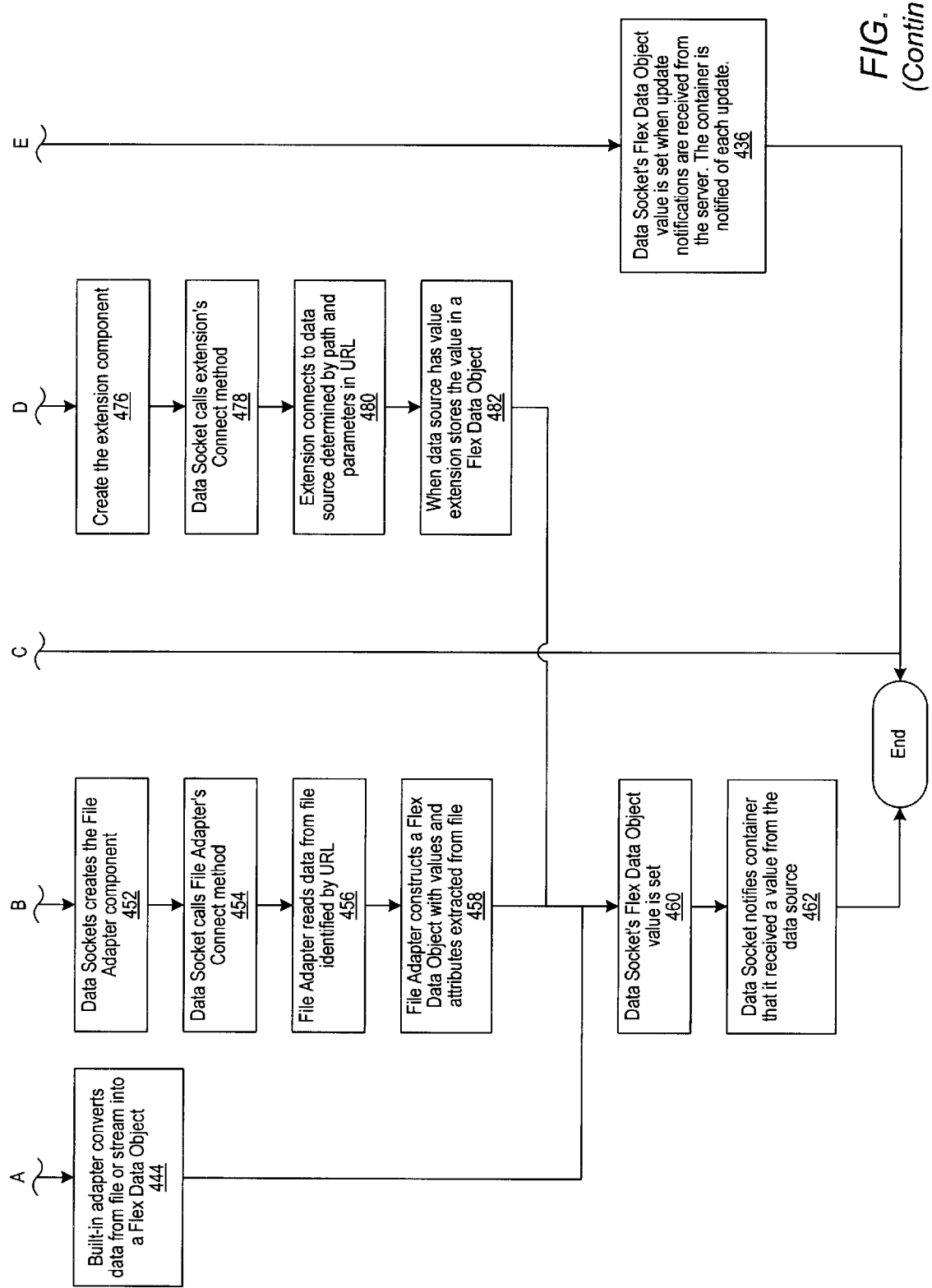

FIGS. 15A–15B: DataSocket Node Flowchart Diagram

FIGS. 15A–15B are a flowchart diagram illustrating the operation of a data access node (preferably using a DataSocket Connect method) according to one embodiment. It is noted that various steps in FIGS. 15A–15B may occur concurrently and/or in different orders. FIGS. 15A–15B illustrate an exemplary embodiment of a data access node that uses DataSocket technology. Also, FIGS. 15A–15B illustrate one embodiment of the DataSocket, but the DataSocket system and method may be implemented in various ways, or data may be exchanged using other techniques besides DataSocket.

As shown in step 402 the DataSocket may receive a request to connect to the specified URL. For example, the developer may have created a program with a GUI element configured to connect to a data source or target specified by the URL. When the program begins execution, the program may attempt to connect to the data source or target, e.g., by requesting the DataSocket to connect to the URL.

In step 404 the DataSocket partitions the URL into an AccessMethod, Host, and Path. The AccessMethod of the URL preferably comprises the first portion of the URL, e.g., http, ftp, file, dstp, snmp, etc. Other AccessMethods are also contemplated. The "Host" portion specifies the host computer where the data is located, and the "Path" specifies the path where the data is located on the host computer.

If the AccessMethod is either http or ftp as determined in step 410, then in step 412 the DataSocket connects to the http or ftp server using conventional technology, e.g., using conventional Internet technology.

After step 412, in step 414 the DataSocket determines the file type. The DataSocket determines the file type for http based on the mime type. The DataSocket may also determine the file type based on the URL path suffix and/or the stream contents. After step 414, operation proceeds to step 442.

If the access method is "file" as determined in step 420, then in step 422 the DataSocket opens the file using the system's file library. In step 424 the DataSocket determines the file type based on the file suffix, the file contents, or parameters contained within the URL. After step 424, operation advances to step 442.

After the DataSocket has determined the file type in either of steps 414 or 424, in step 442 the DataSocket determines if it has built-in support for the type. If the DataSocket has built-in support for the file type as determined in step 442, then in step 444 the built-in adapter comprised in the DataSocket converts the data from the file or stream into a Flex Data object, also referred to as a FlexDataObject.

In step 444 the DataSocket converts the data into a form more usable by a typical programming language or application. Examples of data converted by the DataSocket include WAV files, tabbed text files, DSD files, and text. For example, if the data is retrieved from a spreadsheet, the DataSocket converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The DataSocket preferably operates to convert data of these various formats into arrays of data or numbers for direct use by the application. After step 444, operation proceeds to step 460.

In step 460 the Flex Data object value in the DataSocket is set. This means that the data which was converted into the more usable form in step 444, such as a 2d array, is now stored in memory managed by an object that is accessible by the client program. The client application may get a copy value from the Flex Data object by calling a method on the Flex Data object named "GetValue". This method preferably returns a copy of the value stored in a VARIANT, a structure defined by Microsoft as part of its ActiveX standard for component software. The Value of attributes can be gotten by calling a method named GetAttribute, or set by calling a method called SetAttribute. A VARIANT structure is used for attributes as well. The VARIANT structure can hold simple data types like numbers or Boolean values and data types that require additional memory for storage such as strings and arrays.

In step 462 the DataSocket notifies the container or application using the DataSocket that it has received a value from the data source, preferably through a new data event. Operation then completes.

If the DataSocket does not include built-in support for the file type as determined in step 442, then in step 446 the DataSocket determines if a DataSocket file adapter is registered for that file type. A DataSocket file adapter is created by a user and registered with the DataSocket. The DataSocket file adapter is used to read or write files using custom-defined formats. If a DataSocket file adapter is not registered for that type, then in step 490 the DataSocket notifies the container or application that the value cannot be retrieved, and operation completes.

If a DataSocket file adapter is registered for that file type as determined in step 446, then in step 452 the DataSocket creates the file adapter component or client. In step 454 the DataSocket calls or invokes the file adapter's Connect method. In step 456 the file adapter reads data from the file identified by the URL. In step 458 the file adapter constructs a Flex Data object with values and attributes extracted from the file.

After steps 452–458 have been performed, in step 460 Flex Data object value in the DataSocket is set, and in step 462 the DataSocket notifies the container or application that it has received a value from the URL, and operation completes.

If the access method is "dstp" as determined in step 430, then in step 432 the DataSocket attempts to make a connection to the DataSocket server identified by the URL using the host name or Internet address encoded in the URL according to standard URL syntax. As described above, the access mode "dstp" directs the DataSocket to connect to the DataSocket server identified in the URL. If the connection is established in step 432, then in step 434 the DataSocket sends a command indicating a request to subscribe to a specific tag or item, or to write the value of a specific tag maintained by the DataSocket server. The DataSocket preferably sends this command over TCP/IP. If the specific tag does not exist on the server, then the server may create the tag and give it an initial value, or may report back an error indicating that that the requested tag does not exist. This is a configuration option on the DataSocket server. Reporting errors is preferably done by sending commands over the TCP/IP connection. Commands are preferably sequences of bytes sent over a TCP/IP connection.

After step 434, as updates are received in step 436, the DataSocket sets the value in the DataSocket's Flex Data object and notifies the container or application using the DataSocket. Thus, each time update notifications are received from the server, the Flex Data object is set and the container or application is notified of each update. Step 436 is continually performed as data is received until the container instructs the DataSocket to disconnect from the data source to which it is connected.

If the access method is not "dstp" as determined in step 430, and is not either http, ftp, or file as determined in steps 410 and 420, then in step 472 the DataSocket derives or constructs the name of an extension or plug-in from the access method that was specified in the URL. For example, if the access method is "opc" then the name of the extension or plug-in could be "DataSocketPlugIn_opc".

In step 474 the DataSocket determines if a DataSocket extension or plug-in with that name is registered. Thus, if the access method is not one of the pre-defined types, e.g., http, ftp, file, or dstp, in steps 472 and 474 the DataSocket attempts to intelligently determine the proper extension or plug-in from the access method that was specified in the URL.

If no DataSocket plug-in is registered with the derived name, then the DataSocket notifies the application or container that the value cannot be retrieved, and operation completes.

If a DataSocket plug-in is registered for the determined extension name as determined in step 474, then steps 476–482 are performed.

In step 476 the DataSocket creates an extension component based on the registered DataSocket extension. In other words, the DataSocket instantiates a component from the registered DataSocket extension.

In step 478 the DataSocket calls the extension component's Connect method. In step 480 the extension or plug-in connects to the data source determined by the path and parameters in the URL. In step 482, when the data source has a value, the extension stores the value in a Flex Data object and operation then advances to 460. As discussed above, in steps 460 and 462 the DataSocket's Flex Data object value is set and the DataSocket notifies the container that it has received a value from the data source, and operation then completes.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for creating a graphical program which accesses data from/to one or more of a data source or a data target, wherein the method operates in a computer including a display screen and a user input device, the method comprising:

displaying on the screen a data access node in the graphical program in response to user input, wherein the graphical program comprises a plurality of interconnected nodes which visually indicate functionality of the graphical program; and configuring the data access node with location information of one or more of a data source or a data target;

wherein, during execution of the graphical program, the data access node is operable to access data from/to the one or more of the data source or the data target.

2. The method of claim 1, wherein the computer is coupled to a network;

wherein the one or more of the data source or the data target comprises a device coupled to the network.

3. The method of claim 2, wherein the device is a second computer system coupled to the network.

4. The method of claim 2, wherein the device is an instrument coupled to the network.

5. The method of claim 2, wherein said configuring the data access node comprises providing a URL specifying a location of the one or more of the data source or the data target.

6. The method of claim 1, wherein, during execution of the graphical program, the data access node is operable to continually access live data from/to the one or more of the data source or the data target.

7. The method of claim 1, wherein the one or more of the data source or the data target is a data source;

wherein, during execution of the graphical program, the data access node is operable to acquire data from the data source.

8. The method of claim 7, wherein, during execution of the graphical program, the data access node is operable to continually acquire live data from the data source.

9. The method of claim 1,
wherein the one or more of the data source or the data target is a data target;
wherein, during execution of the graphical program, the data access node is operable to publish data to the data target.

10. The method of claim 9,
wherein, during execution of the graphical program, the data access node is operable to continually publish data to the data target.

11. The method of claim 1, wherein said configuring the data access node includes:
displaying a list of data sources and/or data targets; and
receiving user input to select one or more of the data sources and/or data targets from the list.

12. The method of claim 11, further comprising:
storing a description of the data sources and/or data targets in the computer;
wherein the data access node uses the description of the data sources and/or data targets to access the one or more of the data source or the data target during execution of the graphical program.

13. The method of claim 1, wherein said configuring the data access node comprises:
displaying an icon in the graphical program which references data source/target location information; and
connecting the icon to the data access node;
wherein, during execution of the graphical program, the icon is operable to provide the data source/target location information to the data access node.

14. The method of claim 13, wherein the icon specifies a URL of the one or more of the data source or the data target.

15. The method of claim 1, wherein said configuring the data access node comprises:
displaying an icon in the graphical program which references data source/target location information; and
dragging and dropping the icon onto the data access node;
wherein, during execution of the graphical program, the data access node is operable to use the data source/target location information.

16. The method of claim 15, wherein the icon specifies a URL of the one or more of the data source or the data target.

17. The method of claim 1,
wherein the data access node is configured to acquire data from a data source;
wherein the data access node comprises one or more output terminals; the method further comprising:
connecting the one or more output terminals of the data access node to one or more first nodes in the graphical program;
wherein, during execution of the graphical program,
the data access node is operable to acquire first data from the data source; and
the data access node is operable to provide the first data to the one or more first nodes in the graphical program.

18. The method of claim 1,
wherein the data access node is configured to publish data to a data target;
wherein the data access node comprises one or more input terminals; the method further comprising:
connecting the one or more input terminals of the data access node to one or more first nodes in the graphical program;
wherein, during execution of the graphical program,
the one or more first nodes in the graphical program are operable to provide first data to the one or more input terminals of the data access node; and
the data access node is operable to publish the first data to the data target.

19. The method of claim 1, wherein the method for creating the graphical program further comprises:
arranging on the display a plurality of nodes, wherein the plurality of nodes include the data access node; and
connecting the plurality of nodes together to create the graphical program.

20. The method of claim 19, wherein the plurality of nodes are connected in one of a data flow, control flow, or execution flow format.

21. The method of claim 1, further comprising:
constructing execution instructions in response to the graphical program, wherein the execution instructions are executable to access data from/to the one or more of the data source or the data target.

22. The method of claim 21, further comprising:
executing said execution instructions, wherein the data access node accesses data from/to the one or more of the data source or the data target during said executing.

23. The method of claim 1, wherein the data access node is a data socket node.

24. The method of claim 1,
wherein, during execution of the graphical program, the data access node is operable to:
connect to the one or more of the data source or the data target using a reference to the one or more of the data source or the data target;
acquire data from/publish data to the one or more of the data source or the data target.

25. The method of claim 1,
wherein the data access node is configured to acquire data from a data source;
wherein, during execution of the graphical program, the data access node is operable to:
connect to the data source using the location information of the data source;
acquire data from the data source; and
convert the acquired data to a format useable in the graphical program.

26. The method of claim 1,
wherein the data access node is configured to publish data to a data target;
wherein, during execution of the graphical program, the data access node is operable to:
connect to the data target using the location information of the data target
convert received data to a format useable by the data target; and
publish the data to the data target.

27. A method for creating a graphical program which accesses data from/to one or more of a data source or a data target, wherein the method operates in a computer including a display screen and a user input device, the method comprising:
displaying on the screen a data access node in the graphical program in response to user input; and
configuring the data access node to access one or more of a data source or a data target;
arranging on the display a plurality of nodes, wherein the plurality of nodes include the data access node; and connecting the plurality of nodes together to create the graphical program, wherein the graphical program comprises the plurality of connected nodes, wherein the plurality of connected nodes visually indicate functionality of the graphical program;

wherein, during execution of the graphical program, the data access node is operable to access data from/to the one or more of the data source or the data target.

28. A method for creating a graphical program which acquires data from a data source, wherein the method operates in a computer including a display screen and a user input device, the method comprising:

displaying on the screen a plurality of nodes in response to user input, wherein the plurality of nodes include a data access node;

configuring the data access node with location information of the data source; and connecting the plurality of nodes together to create the graphical program, wherein the graphical program comprises the plurality of connected nodes, wherein the plurality of connected nodes visually indicate functionality of the graphical program;

wherein, during execution of the graphical program, the data access node is operable to acquire data from the data source.

29. The method of claim 28, wherein the computer is coupled to a network;

wherein the data source comprises a device coupled to the network.

30. The method of claim 28, wherein said configuring the data access node comprises providing a URL specifying the data source.

31. The method of claim 28, wherein, during execution of the graphical program, the data access node is operable to continually access live data from the data source.

32. The method of claim 28, wherein said configuring the data access node includes:

displaying a list of data sources; and receiving user input to select one or more of the data sources from the list;

wherein the data access node uses the description of the one or more data sources to access the one or more data sources during execution of the graphical program.

33. The method of claim 28, wherein said configuring the data access node comprises:

displaying an icon in the graphical program which references location information of the data source; and connecting the icon to the data access node;

wherein, during execution of the graphical program, the icon is operable to provide the location information of the data source to the data access node.

34. The method of claim 28, wherein said configuring the data access node comprises:

displaying an icon in the graphical program which references location information of the data source; and dragging and dropping the icon onto data access node.

35. The method of claim 28, wherein the data access node comprises one or more output terminals; the method further comprising:

connecting the one or more output terminals of the data access node to one or more first nodes in the graphical program;

wherein, during execution of the graphical program, the data access node is operable to acquire first data from the data source; and the data access node is operable to provide the first data to the one or more first nodes in the graphical program.

36. The method of claim 28, wherein the plurality of nodes are connected in one of a data flow, control flow, or execution flow format.

37. The method of claim 28, further comprising:

constructing execution instructions in response to the graphical program, wherein the execution instructions are executable to access data from the data source.

executing said execution instructions, wherein the data access node accesses data from the data source during said executing.

38. The method of claim 28, wherein the data access node is a data socket node.

39. The method of claim 28, wherein, during execution of the graphical program, the data access node is operable to:

connect to the data source using a reference to the data source; and acquire data from the data source.

40. The method of claim 28, wherein, during execution of the graphical program, the data access node is operable to:

connect to the data source using a reference to the data source;

acquire data from the data source; and convert the acquired data to a format useable in the graphical program.

41. A method for creating a graphical program which publishes data to a data target, wherein the method operates in a computer including a display screen and a user input device, the method comprising:

displaying on the screen a plurality of nodes in response to user input, wherein the plurality of nodes include a data access node;

configuring the data access node with location information of the data target; and connecting the plurality of nodes together to create the graphical program, wherein the graphical program comprises the plurality of connected nodes, wherein the plurality of connected nodes visually indicate functionality of the graphical program;

wherein, during execution of the graphical program, the data access node is operable to publish data to the data target.

42. The method of claim 41, wherein the computer is coupled to a network;

wherein the data source comprises a device coupled to the network.

43. The method of claim 41, wherein said configuring the data access node comprises providing a URL specifying the data target.

44. The method of claim 41, wherein, during execution of the graphical program, the data access node is operable to continually publish live data to the data target.

45. The method of claim 41, wherein said configuring the data access node includes:

displaying a list of data targets; and receiving user input to select one or more of the data targets from the list;

wherein the data access node uses the description of the one or more data targets to access the one or more data targets during execution of the graphical program.

46. The method of claim 41, wherein said configuring the data access node comprises:
    displaying an icon in the graphical program which references location information of the data target; and
    connecting the icon to the data access node;
    wherein, during execution of the graphical program, the icon is operable to provide the location information of the data target to the data access node.

47. The method of claim 41, wherein said configuring the data access node comprises:
    displaying an icon in the graphical program which references location information of the data target; and
    dragging and dropping the icon onto data access node.

48. The method of claim 41,
    wherein the data access node comprises one or more input terminals; the method further comprising:
    connecting the one or more input terminals of the data access node to one or more first nodes in the graphical program;
    wherein, during execution of the graphical program, the one or more first nodes in the graphical program are operable to provide first data to the one or more input terminals of the data access node; and
    the data access node is operable to publish the first data to the data target.

49. The method of claim 48, wherein the plurality of nodes are connected in one of a data flow, control flow, or execution flow format.

50. The method of claim 41, further comprising:
    constructing execution instructions in response to the graphical program, wherein the execution instructions are executable to publish data to the data target.
    executing said execution instructions, wherein the data access node publishes data to the data target during said executing.

51. The method of claim 41, wherein the data access node is a data socket node.

52. The method of claim 41,
    wherein, during execution of the graphical program, the data access node is operable to:
    connect to the data target using a reference to the data target; and
    publish the data to the data target.

53. The method of claim 41,
    wherein, during execution of the graphical program, the data access node is operable to:
    connect to the data target using a reference to the data target;
    convert received data to a format useable by the data target; and
    publish the data to the data target.

54. A memory medium comprising program instructions for creating a graphical program which accesses data from/to one or more of a data source or a data target, wherein the memory medium is comprised in a computer including a display screen and a user input device, wherein the program instructions are executable to implement:
    displaying on the screen a data access node in the graphical program in response to user input, wherein the graphical program comprises a plurality of interconnected nodes which visually indicate functionality of the graphical program; and
    configuring the data access node with location information of one or more of a data source or a data target;
    wherein, during execution of the graphical program, the data access node is operable to access data from/to the one or more of the data source or the data target.

55. A memory medium comprising program instructions for creating a graphical program which accesses data from a data source, wherein the memory medium is comprised in a computer including a display screen and a user input device, wherein the program instructions are executable to implement:
    displaying on the screen a plurality of nodes in response to user input, wherein the plurality of nodes include a data access node;
    configuring the data access node with location information of the data source; and
    connecting the plurality of nodes together to create the graphical program, wherein the graphical program comprises the plurality of connected nodes, wherein the plurality of connected nodes visually indicate functionality of the graphical program;
    wherein, during execution of the graphical program, the data access node is operable to acquire data from the data source.

56. A memory medium comprising program instructions for creating a graphical program which publishes data to a data target, wherein the memory medium is comprised in a computer including a display screen and a user input device, wherein the program instructions are executable to implement:
    displaying on the screen a plurality of nodes in response to user input, wherein the plurality of nodes include a data access node;
    configuring the data access node with location information of the data target; and
    connecting the plurality of nodes together to create the graphical program, wherein the graphical program comprises the plurality of connected nodes, wherein the plurality of connected nodes visually indicate functionality of the graphical program;
    wherein, during execution of the graphical program, the data access node is operable to publish data to the data target.

57. A memory medium comprising program instructions for creating a graphical program which accesses data from a data source, wherein the memory medium is comprised in a computer including a display screen, wherein the program instructions are executable to implement:
    displaying on the screen a first node in the graphical program during development of the graphical program, wherein the graphical program comprises a plurality of interconnected nodes which visually indicate functionality of the graphical program; and
    configuring the first node with location information of the data source;
    wherein, during execution of the graphical program, the first node is operable to:
    connect to the data source using the location information of the data source;
    acquire data from the data source; and
    convert the acquired data to a format useable in the graphical program.

58. The memory medium of claim 57,
    wherein the computer is coupled to a network;
    wherein the data source comprises a device coupled to the network.

59. The memory medium of claim 58,
    wherein the device is an instrument coupled to the network.

60. The memory medium of claim 57, wherein said configuring the first node comprises providing a URL specifying a location of the data source.

61. The memory medium of claim 57, wherein, during execution of the graphical program, the first node is operable to continually acquire live data from the data source.

62. The memory medium of claim 57, wherein said configuring the first node includes:
displaying a list of data sources; and
receiving user input to select one or more of the data sources from the list.

63. The memory medium of claim 62, wherein the memory medium stores a description of the data sources in the computer;
wherein the first node uses the description of the data sources to access the data source during execution of the graphical program.

64. The memory medium of claim 57, wherein said configuring the first node comprises:
displaying an icon in the graphical program which references the location information of the data source; and
connecting the icon to the first node;
wherein, during execution of the graphical program, the icon is operable to provide the data source location information to the first node.

65. The memory medium of claim 64, wherein the icon specifies a URL of the one or more of the data source or the data target.

66. The memory medium of claim 57, wherein said configuring the first node comprises:
displaying an icon in the graphical program which references the data source location information; and
dragging and dropping the icon onto the first node;
wherein, during execution of the graphical program, the first node is operable to use the data source location information.

67. The memory medium of claim 57, wherein the first node comprises one or more output terminals; wherein the program instructions are further executable to implement:
connecting the one or more output terminals of the first node to one or more second nodes in the graphical program;
wherein, during execution of the graphical program, the first node is operable to:
acquire first data from the data source; and
convert the first data to a format useable by the one or more second nodes;
provide the converted first data to the one or more second nodes in the graphical program.

68. The memory medium of claim 57, wherein the program instructions are further executable to implement:
arranging on the display a plurality of nodes, wherein the plurality of nodes include the first node; and
connecting the plurality of nodes together to create the graphical program.

69. The memory medium of claim 57, wherein the graphical program comprises a plurality of nodes connected in one of a data flow, control flow, or execution flow format.

70. The memory medium of claim 57, wherein the program instructions are further executable to implement:
constructing execution instructions in response to the graphical program, wherein the execution instructions are executable to implement functionality depicted in the graphical program.

71. The memory medium of claim 70, wherein the program instructions are further executable to implement:
executing said execution instructions, wherein the first node accesses data from the data source during said executing.

72. The memory medium of claim 57, wherein the first node is a data socket node.

73. The memory medium of claim 57, wherein the first node connecting to the data source, the first node receiving the data, and the first node converting the data are performed without any user programming required.

74. The memory medium of claim 57, wherein the format is a self-describing format.

75. The memory medium of claim 57, wherein said converting comprises converting the data into a generic format.

76. The memory medium of claim 57, wherein said converting comprises:
converting the data into a first format, wherein the first format includes the data and one or more attributes of the data.

77. The memory medium of claim 76, wherein the data is measurement data, wherein the one or more attributes of the data include one or more of:
a timestamp, acquisition rate, quality of data, test operator name, and a unit under test (UUT) identifier.

78. The memory medium of claim 57, wherein the data comprises waveform data;
wherein said converting includes converting the data into an array of numbers.

79. The memory medium of claim 57, wherein the data located at the data source comprises spreadsheet data in a tab delimited format;
wherein said converting comprises converting the spreadsheet data in the tab delimited format into a 2 dimensional array of numbers;
wherein the graphical program is not required to parse the 2D array of numbers.

80. The memory medium of claim 57, wherein the first node connecting to the data source includes extracting an access method from the location information, wherein the first node uses the access method to connect to the data source and receive the data.

81. A method for creating a graphical program which accesses data from a data source, wherein at least a portion of the method operates in a computer including a display screen, the method comprising:
displaying on the screen a first node in the graphical program during development of the graphical program, wherein the graphical program comprises a plurality of interconnected nodes which visually indicate functionality of the graphical program; and
configuring the first node with location information of the data source;
executing the graphical program, wherein said executing the graphical program comprises:
the first node connecting to the data source using the location information of the data source;
the first node acquiring data from the data source; and
programmatically converting the acquired data to a format useable in the graphical program.

82. A memory medium comprising program instructions for creating a graphical program which publishes data to a data target, wherein the memory medium is comprised in a computer including a display screen, wherein the program instructions are executable to implement:
- displaying on the screen a first node in the graphical program during development of the graphical program, wherein the graphical program comprises a plurality of interconnected nodes which visually indicate functionality of the graphical program; and
- configuring the first node with location information of the data target;
- wherein, during execution of the graphical program, the first node is operable to:
  - connect to the data target using the location information of the data target;
  - convert received data to a format useable by the data target; and
  - publish the converted data to the data target.

83. The memory medium of claim 82,
wherein the computer is coupled to a network;
wherein the data target comprises a device coupled to the network.

84. The memory medium of claim 83,
wherein the device is an instrument coupled to the network.

85. The memory medium of claim 82,
wherein said configuring the first node comprises providing a URL specifying a location of the data target.

86. The memory medium of claim 82,
wherein, during execution of the graphical program, the first node is operable to continually publish live data to the data target.

87. The memory medium of claim 82, wherein said configuring the first node includes:
- displaying a list of data targets; and
- receiving user input to select one or more of the data targets from the list.

88. The memory medium of claim 87,
wherein the memory medium stores a description of the data targets in the computer;
wherein the first node uses the description of the data targets to access the data target during execution of the graphical program.

89. The memory medium of claim 82, wherein said configuring the first node comprises:
- displaying an icon in the graphical program which references the location information of the data target; and
- connecting the icon to the first node;
- wherein, during execution of the graphical program, the icon is operable to provide the data target location information to the first node.

90. The memory medium of claim 89, wherein the icon specifies a URL of the data target.

91. The memory medium of claim 82, wherein said configuring the first node comprises:
- displaying an icon in the graphical program which references the data target location information; and
- dragging and dropping the icon onto the first node;
- wherein, during execution of the graphical program, the first node is operable to use the data target location information.

92. The memory medium of claim 82,
wherein the first node comprises one or more input terminals; wherein the program instructions are further executable to implement:
- connecting the one or more input terminals of the first node to one or more second nodes in the graphical program;
- wherein, during execution of the graphical program, the first node is operable to:
  - receive first data from the one or more second nodes in the graphical program; and
  - convert the first data to a format useable by the data target;
  - provide the converted first data to the data target.

93. The memory medium of claim 82, wherein the program instructions are further executable to implement:
- arranging on the display a plurality of nodes, wherein the plurality of nodes include the first node; and
- connecting the plurality of nodes together to create the graphical program.

94. The memory medium of claim 82, wherein the graphical program comprises a plurality of nodes connected in one of a data flow, control flow, or execution flow format.

95. The memory medium of claim 82, wherein the program instructions are further executable to implement:
- constructing execution instructions in response to the graphical program, wherein the execution instructions are executable to implement functionality depicted in the graphical program.

96. The memory medium of claim 95, wherein the program instructions are further executable to implement:
- executing said execution instructions, wherein the first node publishes data to the data target during said executing.

97. The memory medium of claim 82, wherein the first node is a data socket node.

98. The memory medium of claim 82, wherein the first node connecting to the data target, the first node converting received data to a format useable by the data target, and the first node publishing the converted data are performed without any user programming required.

99. The memory medium of claim 82, wherein the format is a self-describing format.

100. The memory medium of claim 82, wherein said converting comprises converting the data into a generic format.

101. The memory medium of claim 82, wherein said converting comprises:
- converting the data into a first format, wherein the first format includes the data and one or more attributes of the data.

102. The memory medium of claim 101, wherein the data is measurement data, wherein the one or more attributes of the data include one or more of: a timestamp, acquisition rate, quality of data, test operator name, and a unit under test (UUT) identifier.

103. The memory medium of claim 82,
wherein the data comprises waveform data;
wherein said converting includes converting the data into an array of numbers.

104. The memory medium of claim 82,
wherein the received data comprises spreadsheet data in a tab delimited format;
wherein said converting comprises converting the spreadsheet data in the tab delimited format into a 2 dimensional array of numbers;
wherein the data target is not required to parse the 2D array of numbers.

105. The memory medium of claim 82, wherein the first node connecting to the data target includes extracting an access method from the location information, wherein the first node uses the access method to connect to the data target and publish the data.

106. A method for creating a graphical program which publishes data to a data target, wherein at least a portion of the method operates in a computer including a display screen, the method comprising:

displaying on the screen a first node in the graphical program during development of the graphical program, wherein the graphical program comprises a plurality of interconnected nodes which visually indicate functionality of the graphical program; and configuring the first node with location information of the data target;

wherein, during execution of the graphical program, the first node is operable to:

connect to the data target using the location information of the data target;

convert received data to a format useable by the data target; and publish the converted data to the data target.

* * * * *